US010805924B2

(12) United States Patent
Ginde et al.

(10) Patent No.: US 10,805,924 B2
(45) Date of Patent: Oct. 13, 2020

(54) TIME INTERVAL MEASUREMENT CODE-DIVISION MULTIPLE ACCESS TRANSCEIVER

(71) Applicant: Accord Ideation Private Limited, Bangalore (IN)

(72) Inventors: Pranav Purushottam Ginde, Bangalore (IN); Sushma Bhupal Bavache, Belagum (IN)

(73) Assignee: ACCORD IDEATION PRIVATE LIMITED, Bengaluru (IN)

( * ) Notice: Subject to any disclaimer, the term of this patent is extended or adjusted under 35 U.S.C. 154(b) by 0 days.

(21) Appl. No.: 16/296,265

(22) Filed: Mar. 8, 2019

(65) Prior Publication Data

US 2020/0236665 A1    Jul. 23, 2020

(30) Foreign Application Priority Data

Jan. 21, 2019  (IN) .............................. 201941002459

(51) Int. Cl.
*H04W 72/04* (2009.01)
*H04B 7/26* (2006.01)
*H04W 72/08* (2009.01)
*H04B 1/7073* (2011.01)

(52) U.S. Cl.
CPC ........ *H04W 72/044* (2013.01); *H04B 1/7073* (2013.01); *H04B 7/2634* (2013.01); *H04W 72/085* (2013.01); *H04B 2201/7073* (2013.01)

(58) Field of Classification Search
CPC .............. H04W 72/044; H04W 72/085; H04B 1/7073; H04B 7/2634; H04B 2201/7073
See application file for complete search history.

(56) References Cited

U.S. PATENT DOCUMENTS

| 4,337,463 | A  | 6/1982 | Vangen |
| 5,101,416 | A  | 3/1992 | Fenton et al. |
| 5,912,644 | A  | 6/1999 | Wang |
| 7,103,070 | B2 | 9/2006 | Khalifa et al. |
| 7,327,699 | B1 | 2/2008 | Schafer |
| 7,535,931 | B1 | 5/2009 | Zampetti et al. |
| 9,341,716 | B2 | 5/2016 | Syrjarinne et al. |

FOREIGN PATENT DOCUMENTS

| WO | WO1996016700    | * | 6/1996 |
| WO | WO1996016700 A2 |   | 6/1996 |

* cited by examiner

*Primary Examiner* — Sophia Vlahos
(74) *Attorney, Agent, or Firm* — Rangarajan Sourirajan; Rajan Law Office, LLC

(57) ABSTRACT

A time interval measurement code-division multiple access (CDMA) transceiver including a clock manager, a transmit channel, one or more receive channels, and a processor for performing time interval measurement in two-way satellite time and frequency transfer and satellite ranging, is provided. The transmit channel generates a spread signal that is digitally phase modulated to generate and transmit the modulated intermediate frequency signal. The baseband processing of the received signal from each of the remote ground stations is performed in receive channels. A transmission time generation module generates a transmission time measurement and a reception time generation module generates a reception time measurement. The transmission time measurement and the reception time measurement are generated on a latch measurement signal that is received from a latch epoch generation module in each of the receive channels.

26 Claims, 9 Drawing Sheets

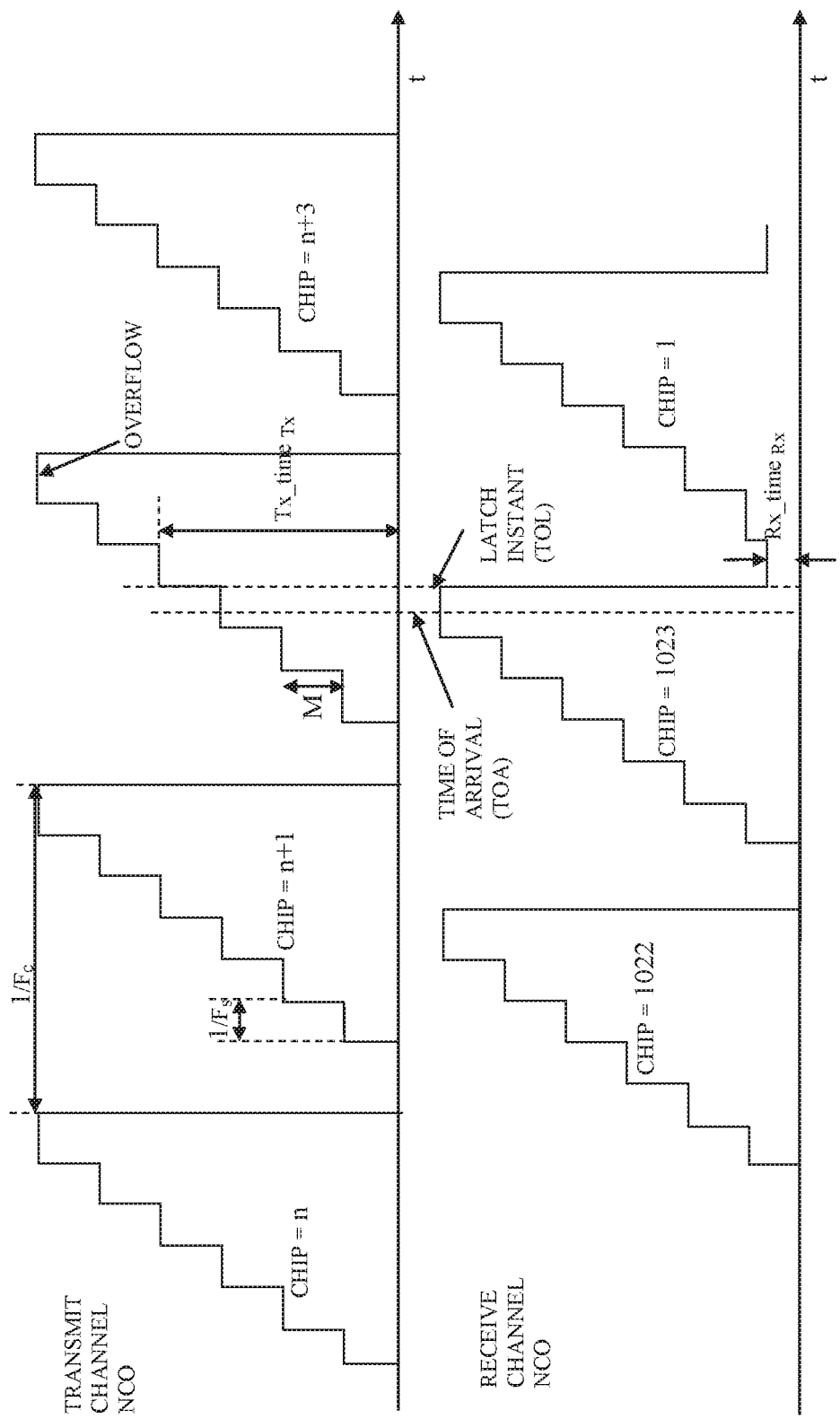

TIME INTERVAL MEASUREMENT CODE-DIVISION MULTIPLE ACCESS TRANSCEIVER

CROSS-REFERENCE TO RELATED APPLICATIONS

This application claims priority to and the benefit of the non-provisional patent application titled "TIME INTERVAL MEASUREMENT CODE-DIVISION MULTIPLE ACCESS TRANSCEIVER", application number 201941002459, filed in the Indian Patent Office on Jan. 21, 2019. The specification of the above referenced patent application is incorporated herein by reference in its entirety.

BACKGROUND

Satellite-based positioning system, for example, the global navigation satellite system (GNSS) positioning system comprising the global positioning system (GPS) and the Globalnaya Navigatsionnaya Sputnikovaya Sistema (GLONASS) provide information on location of a GNSS transceiver based on radio frequency GNSS signals transmitted by the GNSS. The radio frequency GNSS signals are also capable of providing accurate time information at the location of the GNSS transceiver. The time information, typically, comprises time difference between a transmitted radio frequency GNSS signal and a received radio frequency GNSS signal denoting a signal travel time, in turn indicating a distance between the satellite and the GNSS transceiver. Utilizing distance measurements between the transceiver and four or more different satellites in the GNSS, the GNSS transceiver obtains three-dimensional receiver coordinates in a global reference frame and a time difference between a clock in the GNSS transceiver and satellite clocks.

However, the global navigation satellite system (GNSS) signals are degraded by ionosphere and trophosphere delays, multiple transmission paths of the GNSS signals as the GNSS signals are reflected from different surfaces increasing signal travel time of the GNSS signals, visibility of a number of satellites to the GNSS receiver, etc. On degradation, the GNSS signals no longer provide accurate time information. While methods are developed which allow for partial compensation for the degradation of the GNSS signals, for example, differential GPS system, the use of the GNSS signals for high-precision time applications is not satisfactory.

A two-way satellite time and frequency transfer (TWSTFT) system is a GNSS independent system that enables comparison and if required synchronization of a clock positioned in a transceiver to a master reference clock, via a satellite, for example, a geo stationary satellite and a geo synchronous satellite. The TWSTFT system is independent of errors due to the transmission path of the signals between the clock associated with the transceivers and the satellite. The TWSTFT system is used by national calibration authorities, for example, Physikalisch-Technische Bundesanstalt (PTB) Brunswick, etc., for comparing existing time scales based on the atomic clocks. The TWSTFT system works on a basis of an agreement between, for example, different laboratories employing transceivers to simultaneously exchange signals in pairs via a satellite, for example, geo stationary satellite and a geo synchronous satellite. Each of the transceivers at the laboratories determines time difference between transmission of a signal to the other transceiver and reception of a signal originating from the other transceiver. The different methods for transmission of the signal from a transceiver to the other transceiver are, typically, frequency division multiple access (FDMA), code division multiple access (CDMA), and time division multiple access (TDMA).

However, conventional two-way satellite time and frequency transfer (TWSTFT) system is not capable of simultaneous time transfer to multiple ground stations using a conventional transceiver. The conventional transceiver supports only a single channel in a transmitter to transmit a signal to other transceivers and a single channel or multiple channels in a receiver to receive signal from a particular other participating transceiver. Typically, only one pair of ground stations are involved in a TWSTFT communication at a time via the satellite and the transceivers in the participating ground stations. The ground stations use code-division multiple access (CDMA) method to communicate in either direction.

The code-division multiple access (CDMA) transceivers of the two-way satellite time and frequency transfer (TWSTFT) determine a time interval between the transmitted signal and the received signal at each of the receive channels by using a dedicated high resolution time interval counter. The high resolution time interval counter is started by a unique time epoch such as a pulse per second (1-PPS) in the transmitted signal and is stopped by a unique time epoch such as a 1-PPS in received signals from the other transceivers. The time interval counter gives the high resolution time difference between the transmitted 1-PPS signal and the received 1-PPS signals. Typically the time interval counters have a mixed, analog and digital processing as a part of it. The time interval counter forms a significant part of the hardware of the transceiver for each individual receive channel of the transceiver. However, the use of the time interval counter is limited to one receive channel at a time. Furthermore, the CDMA transceiver with multiple receive channels requires a dedicated time interval counter for each of the multiple receive channels.

Typically, in a two-way satellite time and frequency transfer (TWSTFT) system communication with masterclock at a central ground station by each of the remote ground stations is performed only at a predetermined time slot called a session. Each of the remote ground stations usually obtains limited sessions per day. The limited session times are sufficient to determine the local time and frequency offset with respect to the master-clock at each of the remote ground stations. The central ground station and the remote ground stations have stable source of clock such as Cesium or Hydrogen master, or a time scale consisting of an ensemble of such clock sources. Furthermore, phase corrections or frequency corrections are not performed on the time measurement at the participating remote ground stations with stable clock source and the TWSTFT system is used for time and frequency comparison purpose alone.

Moreover, if a remote ground station has a clock source of lower stability such as an oven-controlled crystal oscillator (OCXO), there is a need for more frequent phase corrections and frequency corrections depending on the oscillator characteristics and accuracy of phase and frequency of the time measurement at the remote ground station clock. Therefore, remote ground stations with the clock source of lower stability require more number of sessions with the master clock in the central ground station to obtain required accuracy of phase and frequency of the time measurement. Since the sessions are planned to be in sequential manner with one remote ground station participating per session, there is a limit on the total number of remote ground stations that can communicate with the master-clock in the central ground station to achieve and maintain the required phase and frequency accuracy of the time measurement.

Hence, there is a long felt but unresolved need for a time interval measurement code-division multiple access (CDMA) transceiver for two-way satellite time and frequency transfer (TWSTFT) and satellite ranging comprising a transmit channel and one or more receive channels to generate a time measurement in each of the receiver channels simultaneously and independently. Moreover, there is a need to generate a time-interval measurement at the central ground station for each of the simultaneously participating remote ground stations in a session.

SUMMARY OF THE INVENTION

This summary is provided to introduce a selection of concepts in a simplified form that are further disclosed in the detailed description of the invention. This summary is not intended to determine the scope of the claimed subject matter.

A time interval measurement transceiver implementing code-division multiple access (CDMA), comprising a transmit channel and one or more receive channels, disclosed herein addresses the above recited need for generation of a time measurement in each of the receive channels simultaneously for performing two-way satellite time and frequency transfer and satellite ranging.

The time interval measurement code-division multiple access (CDMA) transceiver disclosed herein comprises a clock manager, a transmit channel operably coupled to the clock manager, one or more receive channels operably connected to the clock manager, and at least one processor communicatively coupled to the clock manager, the transmit channel, and the receive channels. The time interval measurement CDMA transceiver is used in performing two-way satellite time and frequency transfer (TWSTFT) between a central ground station where the time interval measurement CDMA transceiver is positioned and one or more remote ground stations. The time interval measurement CDMA transceiver is also used in performing satellite ranging. The clock manager generates a sampling clock for transmitting a modulated intermediate frequency signal and performing baseband processing of one or more intermediate frequency signals received from the remote ground stations. The transmit channel generates a spread signal that is digitally phase modulated to generate and transmit the modulated intermediate frequency signal. The baseband processing of the received intermediate frequency signals from the remote ground stations is performed in the receive channels.

The transmit channel comprises a first mixer operably coupled to a transmission pseudorandom code generation module for generating the spread signal by mixing a time frame data signal with a pseudorandom code generated by the transmission pseudorandom code generation module. The transmit channel further comprises a transmission time generation module for generating a transmission time measurement on latching of a transmit code phase of the pseudorandom code, and a number of chips of the pseudorandom code, a number of code periods of the pseudorandom code, and a number of bits in the time frame data signal upcounted in multiple transmission counters when a latch measurement signal is received from a latch epoch generation module in each of the receive channels.

Each of the receive channels comprise one or more second mixers for receiving intermediate frequency time data samples from an external interface unit and generating inphase components and quadrature phase components of the received intermediate frequency time data samples by mixing the received intermediate frequency time data samples with a carrier reference signal locally generated by a local carrier generator of each of the receive channels. The intermediate frequency time data samples correspond to the received intermediate frequency signal from each of the remote ground stations. Each of the receive channels further comprises an acquisition and tracking module, multiple correlators, a reception time generation module, and the latch epoch generation module. The acquisition and tracking module acquires and tracks the received intermediate frequency signal from each of the remote ground stations. The correlators correlate the pseudorandom code in the received intermediate frequency time data samples by multiplying and accumulating each of the generated inphase components and the generated quadrature phase components of the received intermediate frequency time data samples with three or more arms of a replica pseudorandom code generated by a reception pseudorandom code generation module. Each of the receive channel is programmed to generate the replica pseudorandom code corresponding to each satellite signal present in the received intermediate frequency signal. The reception time generation module generates a reception time measurement on latching a receive code phase value of the replica pseudorandom code, and a number of chips of the replica pseudorandom code, a number of code periods of the replica pseudorandom code, and a number of bits in the intermediate frequency time data samples in multiple reception counters when the latch measurement signal is received from the latch epoch generation module. The latch epoch generation module generates the latch measurement signal on overflow of one of the reception counters for generating the transmission time measurement of the transmit channel and the reception time measurement of the receive channel corresponding to each of the remote ground stations.

The processor executes computer program instructions defined by modules of the time interval measurement code-division multiple access (CDMA) transceiver. The modules of the time interval measurement CDMA transceiver comprise a time interval measurement module and a time interval transmission module. The time interval measurement module computes a time interval measurement as half of a difference between the generated transmission time measurement and the reception time measurement generated by each of the receive channels. The time interval measurement module removes time of arrival of the intermediate frequency signal from the time interval measurement of each of the remote ground stations. The time interval transmission module transmits the computed time interval measurement to each of the remote ground stations via the transmit channel based on a station identifier of each of the remote ground stations present in the received intermediate frequency signal.

In an embodiment, the time interval measurement code-division multiple access (CDMA) transceiver performing two-way satellite time and frequency transfer (TWSTFT) and satellite ranging is implemented as an application specific integrated circuit (ASIC) or a field programmable gate array (FPGA), in which the number of receive channels can be easily programmed and scaled without any changes to the transceiver hardware.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, in an embodiment, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

FIG. 7 exemplarily illustrates a timing diagram showing latching of transmit code phase words and receive code phase words by the transmit channel and the receive channel of the time interval measurement transceiver on generation of a latch measurement signal in the receive channel for the structure of the time frame data signal exemplarily illustrated in FIG. 6.

DETAILED DESCRIPTION OF THE INVENTION

Figure 1:
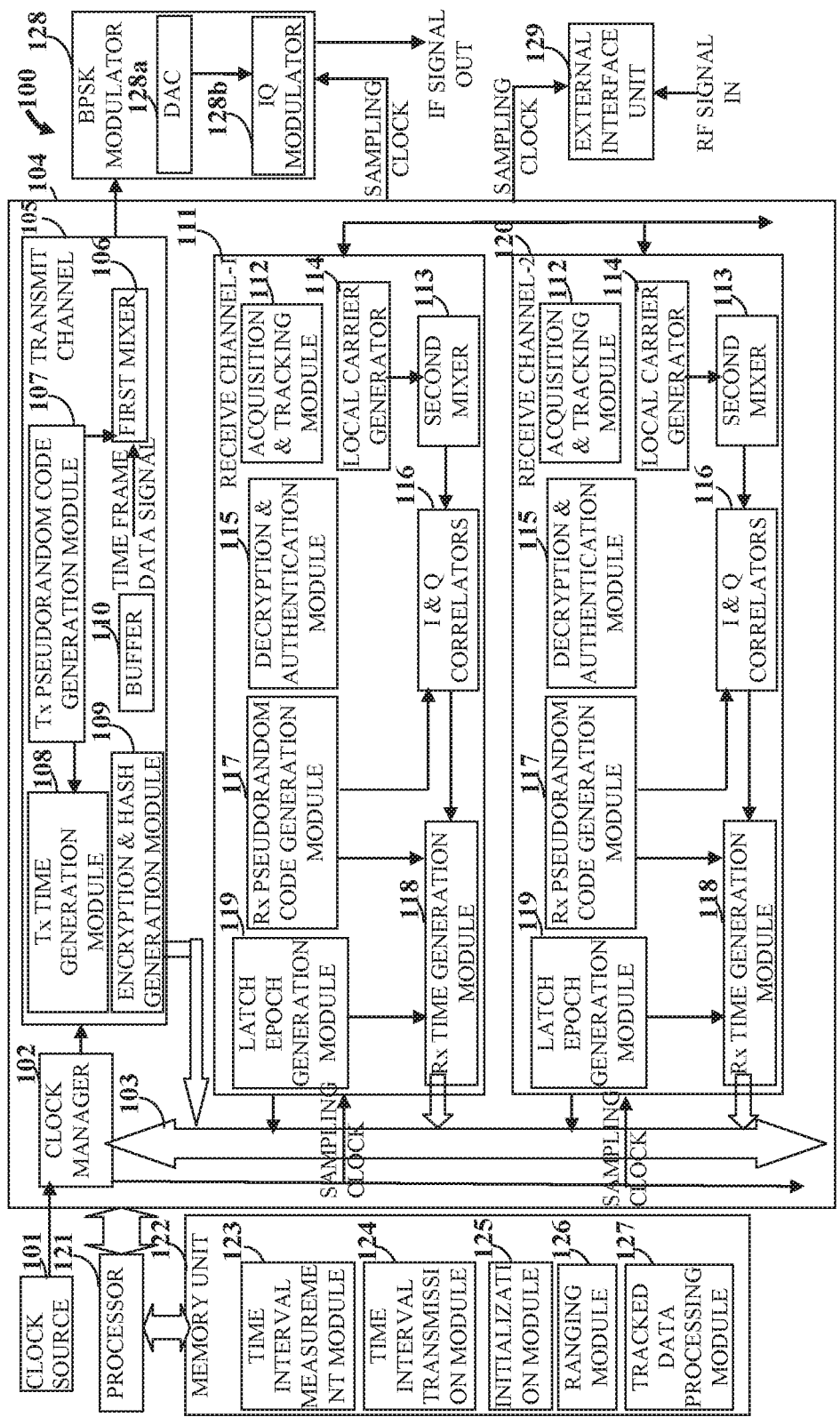
FIG. 1 exemplarily illustrates an architectural diagram of a time interval measurement transceiver positioned in a central ground station for performing two-way satellite time and frequency transfer and satellite ranging.

FIG. 1 exemplarily illustrates an architectural diagram of a time interval measurement transceiver 100 positioned in a central ground station for performing two-way satellite time and frequency transfer and satellite ranging. As used herein, "two-way satellite time and frequency transfer" refers to a method involving signals that travel both ways between a clock positioned in a central ground station and a clock positioned in a remote ground station that are being compared. The two-way satellite time and frequency transfer (TWSTFT) is a technique used for comparison of a clock positioned in a central ground station and a clock positioned in remote ground station via a satellite, for example, a geo stationary satellite and a geo synchronous satellite radio link. Also, as used herein, "satellite ranging" refers to method involving measurement of time required for a signal to traverse the path to and from a satellite, for example, a geostationary and a geosynchronous satellite to which range needs to be determined. The time interval measurement transceiver 100 is positioned in a central ground station and communicates with one or more remote ground stations comprising a time interval measurement transceiver. The central ground station and the remote ground stations comprise installations for transmitting and receiving radio frequency signals. The time interval measurement transceiver 100 implements code-division multiple access (CDMA) and is, hereafter, referred to as a time interval measurement CDMA transceiver 100. The time interval measurement CDMA transceivers at the central ground station and the remote ground stations exchange radio frequency signals. In two-way satellite time and frequency transfer, the central ground station is referred to as a master station and the remote ground station is referred to as a slave station. The time interval measurement transceiver positioned in the central ground station and the remote ground station have the same construction and architecture but are programmed to be different in function that they perform depending on whether they need to function as a master station transceiver or a slave station transceiver respectively. The master station transceiver is programmed to have multiple receive channels, for example, one for each of the remote ground stations. The slave station transceiver is programmed to have only one receive channel, to receive and process the signal from the master station.

The time interval measurement code-division multiple access (CDMA) transceiver 100 uses CDMA technique to communicate with the remote ground stations. That is, the time interval measurement CDMA transceiver 100 transmits a time frame data signal by multiplying the time frame data signal with a spreading code, that is, a pseudorandom code to generate a spread signal. Using CDMA technique, the time interval measurement CDMA transceiver 100 in the central ground station performs time measurements of all the received signals received from the remote ground stations. Moreover, the time interval measurement CDMA transceiver 100 performs periodic time measurements of all the received signals received from the remote ground stations. The time interval measurement CDMA transceiver 100 modulates the time frame data signal onto an intermediate frequency signal and up converts the modulated intermediate frequency signal to a radio frequency signal to be transmitted to the remote ground stations. The time interval measurement CDMA transceiver 100 transmits a radio frequency signal to each of the remote ground stations and receives radio frequency signal from the remote ground stations via a satellite. The time interval measurement CDMA transceiver 100 receives the radio frequency signal from the remote ground stations and down converts to the intermediate frequency signal and digitizes the intermediate frequency signal to obtain intermediate frequency time data samples. As used herein, "time frame data signal" refers to a digital signal comprising time information transmitted in the form of a data frame of a predetermined number of bits. Format of the time frame data signal that is transmitted from the master station to the slave station could be same or different from the format of the time frame data signal transmitted from the slave station to the master station. The time frame data signal comprises preamble, frame identifier, frame version, time information, decryption validation key, remote ground station identification, time offset measured at local station which could be a master station or a slave station, signal strength of other station observed at local station, time reference delay, transmission signal power level at local station, calibration value, calibration technique identification, frequency offset measured at local station with respect to other station, health status of the local system, time validity, reserved fields, hash value, parity check fields. In two-way satellite time and frequency transfer (TWSTFT), an exchange of the time information between the central ground station and each of the remote ground stations is performed at same time and same frequency of operation in both the central ground station and the remote ground stations. Propagation time of the radio frequency signal from the central ground station to the remote ground station is almost same as the propagation time of the radio frequency signal from the remote ground station to the central ground station, except for a few asymmetric delays due to effect of ionosphere on different up conversion frequencies and down conversion frequencies used and local tropospheric effects, which are negligible. The other sources of asymmetric delays comprise of asymmetric signal path delay through the satellite in each direction, and local station transmit and receive chain path delays, and Sagnac corrections which need to either calibrated or calculated and compensated by the respective remote ground stations.

The time interval measurement code-division multiple access (CDMA) transceiver 100 comprises a clock manager 102, a transmit channel 105, one or more receive channels 111 and 120, and at least one processor 121 communicatively coupled with the clock manager 102, the transmit channel 105 and the receive channels 111 and 120. In an embodiment, the clock manager 102, the transmit channel 105, and the receive channels 111 and 120 are implemented in a single chip as exemplarily illustrated in FIG. 5. In another embodiment, the clock manager 102, the transmit channel 105, and the receive channels 111 and 120 are implemented independently on separate chips. In another embodiment, the combination of the clock manager 102, the transmit channel 105, and the receive channels 111 and 120 are implemented as an application specific integrated circuit (ASIC) or a field programmable gate array (FPGA) 104 as exemplarily illustrated in FIG. 1. The clock manager 102 generates a sampling clock for transmitting the modulated intermediate frequency signal and performing baseband processing of intermediate frequency signal comprising of signals received from the remote ground stations. The clock manager 102 manipulates a clock signal generated by a clock source 101 made of, for example, Quartz, Rubidium, cesium, etc. As used herein, "transmit channel" refers to a communication channel in the time interval measurement CDMA transceiver 100 that is used to transmit the modulated intermediate frequency signal to the remote ground stations. Also, as used herein, "receive channel" refers to a communication channel in the time interval measurement CDMA transceiver 100 that is used to receive intermediate frequency signals from the remote ground stations. In each of the receive channels 111 and 120, baseband processing of a received intermediate frequency signal is performed. As used herein, "baseband processing" refers to a process of removing Doppler frequency from the received intermediate frequency signal and correlating the received intermediate frequency signal stripped off of the Doppler frequency with a locally generated replica pseudorandom code to track code phase of the received intermediate frequency signal. The time interval measurement CDMA transceiver 100 further comprises a data bus 103 that permits communications between the modules, for example, 121, 105, 122, 111, and 120, etc.

The transmit channel 105 is operably coupled to the clock manager 102 and generates the spread signal that is digitally phase modulated to generate and transmit the modulated intermediate frequency signal. The transmit channel 105 comprises a first mixer 106 operably coupled to a transmission pseudorandom code generation module 107 and a transmission time generation module 108. The first mixer 106 generates the spread signal by multiplying the time frame data signal with a pseudorandom code generated by the transmission pseudorandom code generation module 107. As used herein, "pseudorandom code" refers to a unique binary code sequence of pulses representing +1s and −1s that are used by the time interval measurement code-division multiple access (CDMA) transceiver 100 to spread the time frame data signal and generate the spread signal. The pseudo random codes are not truly random but have a finite length and are known to the central ground station and the remote ground stations. A pulse in the pseudorandom code refers to a "chip". The sequence of the chips in the pseudorandom code repeats itself after a time period referred to as a "code period". The transmission pseudorandom code generation module 107 comprises a pseudorandom code generator 107a and a transmission code numerically controlled oscillator 107b as disclosed in the detailed description of FIG. 2. The transmission code numerically controlled oscillator 107b controls the pseudorandom code generator 107a to generate the pseudorandom code. The transmission code numerically controlled oscillator 107b comprises a phase accumulator and a phase-to-amplitude converter operably connected to the phase accumulator. The phase accumulated in the phase accumulator is a transmit code phase. As used herein, "transmit code phase" refers to a phase of the pseudorandom code that generates the spread signal. The transmit code phase is the phase of the pseudorandom code accumulated in the phase accumulator of the transmission numerically controlled oscillator. The transmission code numerically controlled oscillator 107b operates at the sampling clock to generate a code clock to run the pseudorandom code generator 107a.

Figure 2:
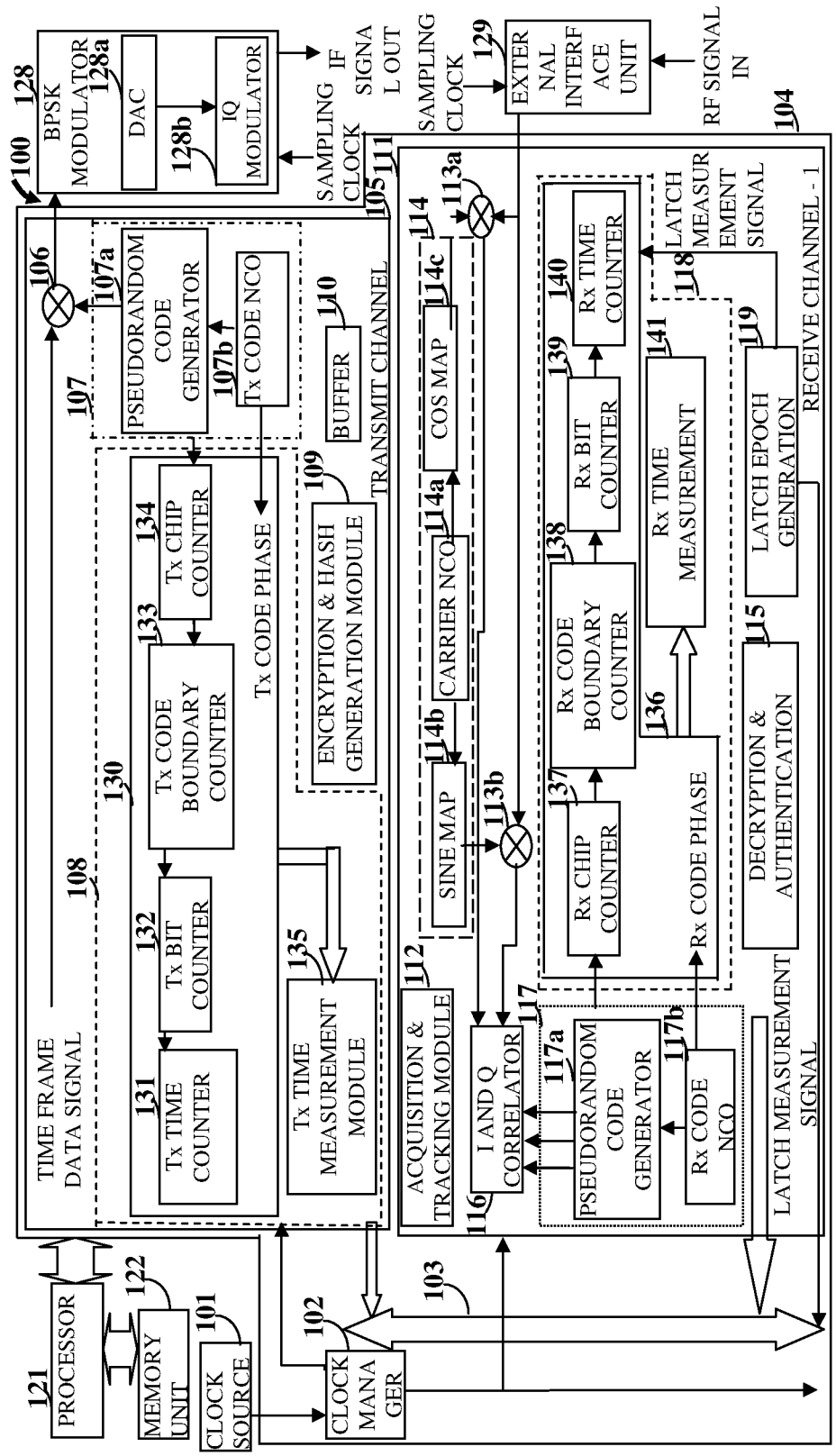
FIG. 2 exemplarily illustrates a low level architectural diagram of the time interval measurement transceiver comprising a transmit channel and a receive channel for performing two-way satellite time and frequency transfer and satellite ranging.

The transmission time generation module 108 generates a transmission time measurement on latching of the transmit code phase of the pseudorandom code, and a number of chips of the pseudorandom code, a number of code periods of the pseudorandom code, and a number of bits in the time frame data signal upcounted in multiple transmission counters 130 as disclosed in the detailed description of FIG. 2, when a latch measurement signal is received from a latch epoch generation module 119 in each of the receive channels 111 and 120. The transmission counters 130 are registers in which the number of chips of the pseudorandom code, the number of code periods of the pseudorandom code, the number of bits of the time frame data signal are counted as the time frame data signal is multiplied with the pseudorandom code in the first mixer 106 and bits of the spread signal are generated. The transmission counters 130 operate at the sampling clock. On the occurrence of the latch measurement signal, the values of the number of chips of the pseudorandom code, the number of code periods of the pseudorandom code, the number of bits of the time frame data signal in the transmission counters 130 and the transmit code phase in a phase accumulator of the transmission code numerically controlled oscillator 107b is latched and the transmission time measurement is generated as disclosed in the detailed description of FIG. 2. The latch measurement signal acts as an epoch to latch the transmit code phase of the pseudorandom code, the number of chips of the pseudorandom code, the number of code periods of the pseudorandom code, the number of bits of the time frame data signal in the transmission counters 130. As used herein, "epoch" refers to an instant in time from which time is measured. As used herein, "latch" refers to the act of reading value of a counter at an epoch and registering the value for further process without affecting the counter being latched.

In an embodiment, the transmit channel 105 further comprises an encryption and hash generation module 109 for generating the cryptographic hash for the time frame data signal to be transmitted to the remote ground stations and encrypting the time frame data signal prior to transmission to the remote ground stations. The transmit channel 105 implements standard algorithms, for example, AES SERPENT-256 encryption algorithm and SHA-256 hash generation algorithm, to encrypt the time frame data signal before transmission as a radio frequency signal to the remote ground stations.

The receive channels 111 and 120 of the time interval measurement code-division multiple access (CDMA) transceiver 100 are operably coupled to the clock manager 102 for performing the baseband processing of the received intermediate frequency signals from the remote ground stations. Each of the receive channels 111 and 120 comprises an acquisition and tracking module 112, one or more second mixers 113, a local carrier generator 114, multiple correlators 116, a reception pseudorandom code generation module 117, a reception time generation module 118, and the latch epoch generation module 119. The acquisition and tracking module 112 acquires and tracks the received intermediate frequency signal from each of the remote ground stations. The acquisition process of the acquisition and tracking module 112 acquires the received intermediate frequency signal by performing a two dimensional pseudorandom code and carrier signal search in frequency and code phase domain on the received intermediate frequency time data samples. The output of the acquisition process by the acquisition and tracking module 112 is a coarse estimate of the code phase of the pseudorandom code and the frequency of the carrier signal of the received intermediate frequency signal. The tracking process of the acquisition and tracking module 112 programs the reception pseudorandom code generation module 117 and the local carrier generator 114 with acquired code phase and carrier frequency to start tracking process. Thereafter, the tracking process samples the outputs of the I and Q correlators 116 and updates the reception code numerically controlled oscillator 117b and reception carrier numerically controlled oscillator 113a to periodically align the replica pseudorandom code and replica carrier frequency in phase and frequency to the phase and frequency of the pseudorandom code and carrier signal in the received intermediate frequency time data samples using a code lock loop and carrier lock loop respectively. In another embodiment, the acquisition and tracking modules 112 of each of the receive channels 111 and 120 are implemented as a part of the processor 121 that work on the output of I and Q correlators 116 and programs the reception code numerically controlled oscillator 117b and reception carrier numerically controlled oscillator 113a to acquire and track the received intermediate frequency signal.

The second mixers 113 receive the intermediate frequency time data samples from an external interface unit 129 and mix the received intermediate frequency time data samples with a carrier reference signal locally generated by the local carrier generator 114 of each of the receive channels 111 and 120. The intermediate frequency time data samples correspond to the received intermediate frequency signal from each of the remote ground stations. The radio frequency signals received from the remote ground stations are frequency down converted to intermediate frequency signals and the intermediate frequency signals are converted to intermediate frequency time data samples in the external interface unit 129 as disclosed in the detailed description of FIG. 3. The mixing of the received intermediate frequency time data samples with the carrier reference signal generates inphase components and quadrature phase components of the received intermediate frequency time data samples. The inphase components of the received intermediate frequency time data samples refer to components that are offset in phase by a zero cycle with respect to the carrier reference signal. The quadrature phase components of received intermediate frequency time data samples refer to components that are offset in phase by a one-quarter cycle with respect to the carrier reference signal. The local carrier generator 114, for example, a numerically controlled oscillator (NCO) 114a generates the locally generated carrier reference signal of a numerically controlled oscillator frequency ($f_{NCO}$). The numerically controlled oscillator (NCO) 114a is programmed to generate the locally generated carrier reference signal with predetermined Doppler frequency offset.

The generated inphase components and the generated quadrature phase components of the received intermediate frequency time data samples are transmitted to the correlators, for example, I and Q correlators 116 for correlating generated inphase components and the generated quadrature phase components with a replica pseudorandom code generated by a reception pseudorandom code generation module 117. The correlators 116 multiply and accumulate each of the generated inphase components and the generated quadrature phase components of the received intermediate frequency time data samples with three or more arms of a replica pseudorandom code generated by the reception pseudorandom code generation module 117. As used herein, "arms" refers to time varied replicas of the replica pseudorandom code. For example, early, prompt, and late are the arms of the replica pseudorandom code, where early is a time advanced replica of the replica pseudorandom code, prompt is a time aligned replica of the replica pseudorandom code, and late is a time delayed replica of the replica pseudorandom code. The arms define the replica pseudorandom code that corresponds to different replica pseudorandom code chip shifts.

As used herein, "replica pseudorandom code" refers to a unique binary code sequence of pulses representing +1s and −1s that are generated by a pseudorandom code generator 117a in the reception pseudorandom code generation module 117 to wipe-off the pseudorandom code used for spreading the time frame data signal and obtain the time frame data signal transmitted by the remote ground station. An initialization module 125 of the time interval measurement code-division multiple access (CDMA) transceiver 100 executed by the processor 121 programs the reception pseudorandom code generation module 117 to generate the replica pseudorandom code. A pulse in the replica pseudorandom code is a chip. The sequence of the chips in the replica pseudorandom code repeats itself after a code period. The reception pseudorandom code generation module 117 comprises the pseudorandom code generator 117a and a reception code numerically controlled oscillator 117b as disclosed in the detailed description of FIG. 2. The reception code numerically controlled oscillator 117b, functioning at the sampling clock, controls the pseudorandom code generator 117a to generate the replica pseudorandom code in the reception pseudorandom code generation module 117. The reception code numerically controlled oscillator 117b comprises a phase accumulator and a phase-to-amplitude converter operably connected to the phase accumulator. The phase accumulated in the phase accumulator of the reception code numerically controlled oscillator 117b at every sampling clock is a receive code phase. As used herein, "receive code phase" refers to a phase of the replica pseudorandom code for de-spreading the received intermediate frequency time data samples. The reception code numerically controlled oscillator 117b generates a code clock to activate the pseudorandom code generator 117a of the reception pseudorandom code generation module 117.

The reception time generation module 118 generates a reception time measurement on latching the receive code phase of the replica pseudorandom code, and a number of chips of the replica pseudorandom code, a number of code periods of the replica pseudorandom code, and a number of bits in the received intermediate frequency time data samples in multiple reception counters 136 as disclosed in the detailed description of FIG. 2, when the latch measurement signal is received from the latch epoch generation module 119. The reception counters 136 are registers in which the number of chips of the replica pseudorandom code, the number of code periods of the replica pseudorandom code, the number of bits in the intermediate frequency time data samples are counted as the generated inphase components and the generated quadrature phase components of the received intermediate frequency time data samples are correlated with the arms of the replica pseudorandom code in the correlators 116 for code wipe-off. The reception counters 136 operate at the sampling clock.

The latch epoch generation module 119 of a receive channel 111, generates the latch measurement signal at the sampling clock on overflow of one of the reception counters 136, for example on overflow of receive chip counter 137, or receive code boundary counter 138, or a receive bit counter 139, or the receive time counter 140, for generating the transmission time measurement of the transmit channel 105 and the reception time measurement of the receive channel 111 as disclosed in the detailed description of FIG. 2. On the occurrence of the latch measurement signal, the values of the number of chips of the pseudorandom code, the number of code periods of the pseudorandom code, the number of bits of the received intermediate frequency time data samples in the reception counters 136 and the receive code phase in the phase accumulator of the reception code numerically controlled oscillator 117b is latched and the reception time measurement is generated as disclosed in the detailed description of FIG. 2. The latch measurement signal also, acts as an epoch to latch the receive code phase of the pseudorandom code, the number of chips of the pseudorandom code, the number of code periods of the pseudorandom code, the number of bits of the received intermediate frequency time data samples in the reception counters 136. The latch epoch generation module 119 generates the latch measurement signal for generating the transmission time measurement of the transmit channel 105 and the reception time measurement of one of the receive channels 111 independent of the other receive channel 120. In an embodiment, the transmission time measurement and the reception time measurement are latched with respect to an external independent source of reference instead of a signal epoch, that is, the latch measurement signal in one of the receive channels 111 and 120.

In an embodiment, each of the receive channels 111 and 120 further comprises a decryption and authentication module 115 for decrypting and authenticating the received intermediate frequency signal from the remote ground stations, after performing the baseband processing of the received intermediate frequency signal. The receive channels 111 and 120 implement standard decryption and authentication algorithms to decrypt received intermediate frequency signal and authenticate the decrypted intermediate frequency after performing the baseband processing of the received intermediate frequency signal. For example, the receive channels 111 and 120 implement SERENT-256 decryption algorithm to decrypt data bits of the time frame data signal in the received intermediate frequency signal and SHA-256 hash algorithm to authenticate the decrypted data bits of the time frame data signal in the received intermediate frequency signal.

In another embodiment, the time frame data signal can be encrypted first and then appended with cryptographic hash function before transmission in the transmit channel 105 of the time interval measurement code-division multiple access (CDMA) transceiver 100. The decryption and authentication module 115 receive channel 111 and 120 authenticates and decrypts the received intermediate frequency signal from the ground station, after performing the baseband processing of the received intermediate frequency signal.

The processor 121 executes computer program instructions defined by modules 123, 124, 125, 126, and 127 of the time interval measurement code-division multiple access (CDMA) transceiver 100 and is communicatively coupled to a non-transitory computer readable storage medium, for example, a memory unit 122. The processor 121 refers to any one or more microprocessors, central processing unit (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. In an embodiment, the processor 121 is implemented as a processor set comprising, for example, a programmed microprocessor and a math or graphics co-processor. The processor 121 is selected, for example, from the Intel® processors such as the Itanium® microprocessor, the Pentium® processors, the Intel® Core i5 processor, the Intel® Core i7 processor, etc., Advanced Micro Devices (AMD®) processors such as the Athlon® processor, Ultra-SPARC® processors, microSPARC® processors, hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, Xilinx® system on a chip, Xilinx® multiprocessor system on a chip (MpSoC), Xilinx® radio frequency system on a chip (RFSoC), etc. The time interval measurement CDMA transceiver 100 disclosed herein is not limited to employing a processor 121. In an embodiment, the time interval measurement CDMA transceiver 100 employs a controller or a microcontroller.

As used herein, "non-transitory computer readable storage medium" refers to all computer readable media, for example, non-volatile media, volatile media, and transmission media, except for a transitory, propagating signal.

Non-volatile media comprise, for example, solid state drives, optical discs or magnetic disks, and other persistent memory volatile media including a dynamic random access memory (DRAM), which typically constitute a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to the processor 121. The non-transitory computer readable storage medium is configured to store computer program instructions defined by modules, for example, 123, 124, 125, 126, and 127. The modules comprise a time interval measurement module 123 and a time interval transmission module 124. The time interval measurement module 123 computes a time interval measurement as half of a difference between the generated transmission time measurement in the transmit channel 105 and the reception time measurement generated by each of the receive channels 111 and 120 as disclosed in the detailed description of FIG. 2. The time interval transmission module 124 transmits the computed time interval measurement to each of the remote ground stations via the transmit channel 105 based on a station identifier of each of the one or more remote ground stations present in the received intermediate frequency signal.

Figure 3:
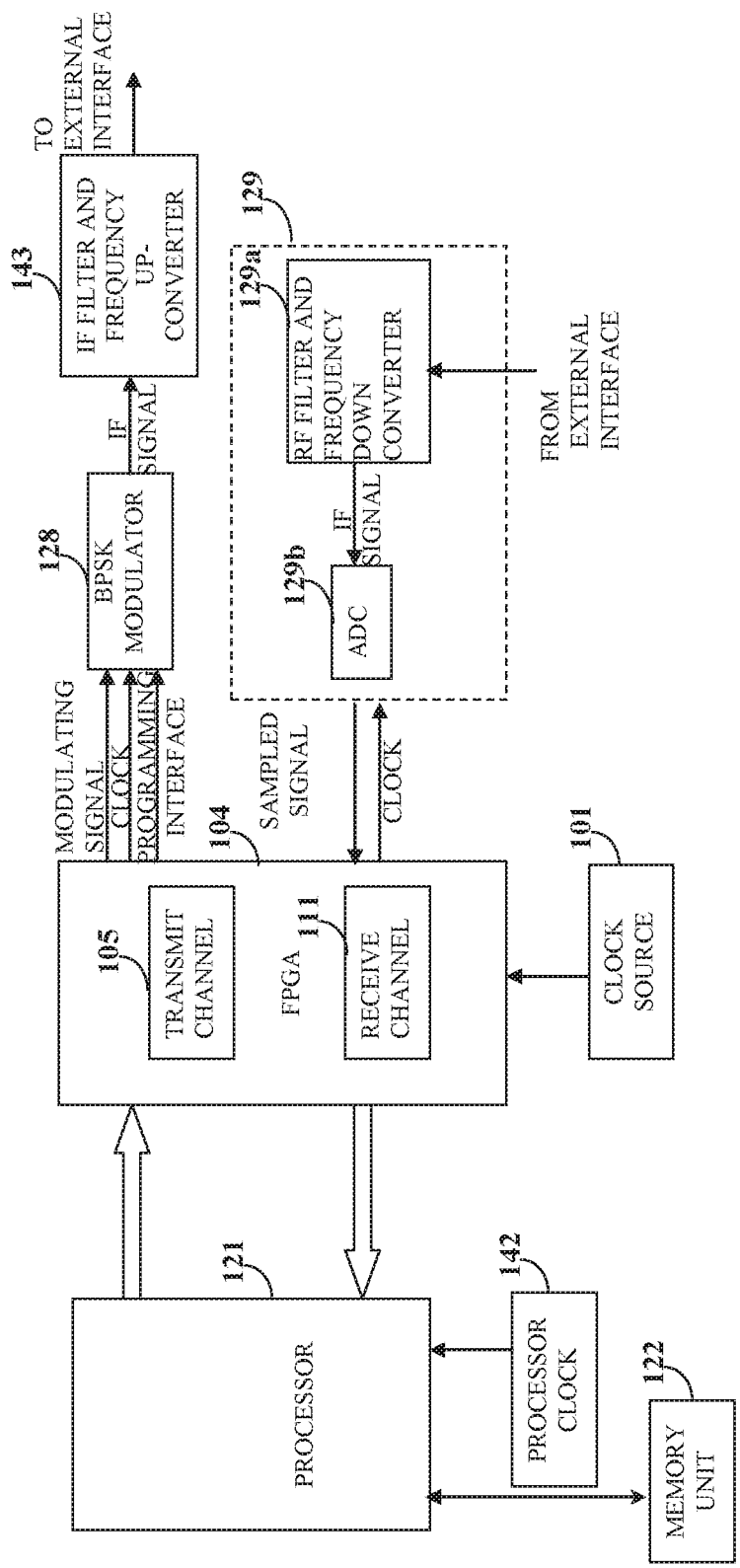
FIG. 3 exemplarily illustrates a high level architectural diagram of an embodiment of the time interval measurement transceiver comprising a transmit channel and a receive channel implemented on a field programmable gate array.

The time interval measurement code-division multiple access (CDMA) transceiver 100 further comprises a binary phase shift keying modulator 128 communicatively coupled to the transmit channel 105 for the digital phase modulation of the generated spread signal and generating the modulated intermediate frequency signal to be transmitted to each of the remote ground stations via an intermediate frequency filter and a frequency up-converter 143 as exemplarily illustrated in FIG. 3.

The intermediate frequency signals received from the remote ground stations is a composite signal processed in each of the receive channels 111 and 120. Each of the receive channels 111 and 120 is programmed to acquire and track the received intermediate frequency signal from a particular remote ground station, by generating a unique replica pseudorandom code similar to the pseudorandom code in the received intermediate frequency signal transmitted from a particular remote ground station. The transmission counters 130 in the transmit channel 105 are available for latching in each of the receive channels 111 and 120 by generation of a latch measurement signal in each of the receive channels 111 and 120 at sampling rate $f_s$ in the field programmable gate array (FPGA). Depending on the latch measurement signal, in a particular receive channel, for example receive channel-N 120, the transmission time measurement in the transmit channel 105 is latched independent of the other receive channel 111. The time difference between the transmitted modulated intermediate frequency signal and the received intermediate frequency signal in a receive channel-N is calculated from the transmission time measurement of the transmit channel 105 and the reception time measurement of the receive channel-N by the time interval measurement module 123 executed by the processor 121. In an embodiment, the time interval measurement module 123 is implemented on the FPGA and is executed by the processor 121. The time interval transmission module 124 transmits the calculated time difference to the remote ground station whose transmitted intermediate frequency signal is tracked in the receive channel-N with a unique station identifier of the remote ground station. The unique station identifier forms a part of the received intermediate frequency signal received from the remote ground station. The architecture of the time interval measurement code-division multiple access (CDMA) transceiver 100 exemplarily illustrated in FIG. 1 comprising a transmit and multiple receive channels 111 and 120 positioned in the master central ground station and generates and transmits time difference measurements to multiple receiver slave stations via radio frequency signals enabling simultaneous two-way satellite time and frequency transfer (TWSTFT) with the multiple remote ground stations. The time interval transmission module 124 transmits the calculated time difference via a dedicated wired link or a wireless link between each of the receiver slave stations and the master central ground station.

In the application of satellite ranging, the transmit channel 105 of the time interval measurement code-division multiple access (CDMA) transceiver 100 generates the intermediate frequency signal and that is binary phase shift keying modulated and up-converted to an up-link radio frequency and transmitted to a satellite, for example, a geo stationary satellite and a geo synchronous satellite. The transmission counters 130 in the transmit channel 105 of the time interval measurement CDMA transceiver 100 upcount when the intermediate frequency signal is being generated. A transponder of the satellite frequency-translates the radio frequency signal received from the time interval measurement CDMA transceiver 100 in the central ground station for example, to a down-link radio frequency-frequency and radiates back to earth. The external interface unit 129 of the time interval measurement CDMA transceiver 100 in the central ground station then down-converts the received radio frequency signal to a low intermediate frequency signal and processes the intermediate frequency signal. The receive channel 111 of the time interval measurement CDMA transceiver 100 performs carrier wipe-off and code wipe off as disclosed in the detailed description of FIG. 2. The receive channel 111 acquires and tracks the pseudorandom code in the received intermediate frequency signal and the reception counters 136 in the receive channel 111 upcount. On generation of a latch measurement signal from the latch epoch generation module 119 in the receive channel, the transmission time measurement and the reception time measurement from the transmission counters 130 and the reception counters 136 is generated. A ranging module 126 of the time interval measurement CDMA transceiver 100 measures time required for the modulated intermediate frequency signal to traverse a path to and from the satellite and converting the measured time to a distance on multiplying the measured time with a velocity of light.

In an embodiment, only the transmission counters 130 are used for generating the transmission time measurement and the reception time measurement. On transmission of an epoch, for example, a pulse per second by way of dummy bits of a time frame aligned to the pulse per second, spread using a pseudorandom code and binary phase shift keying modulated onto a radio frequency carrier signal, in the intermediate frequency signal, the transmission counters 130 are started. The receive channel 111 of the time interval measurement code-division multiple access (CDMA) transceiver 100 stops the transmission counters 130 on reception of the epoch derived from the radio frequency signal received from the satellite after performing code wipe-off as disclosed in the detailed description of FIG. 2. The count in the transmission counters 130 represents the time taken by the radio frequency signal from the transmit channel 105 to make a two-way trip to the satellite.

FIG. 2 exemplarily illustrates a low level architectural diagram of a time interval measurement code-division multiple access (CDMA) transceiver 100 comprising a transmit channel 105 and a receive channel 111 for performing two-way satellite time and frequency transfer and satellite ranging simultaneously. The time interval measurement CDMA transceiver 100 comprises the clock manager 102, the processor 121, the transmit channel 105, the receive channel 111, the binary phase shift keying modulator 128, and the external interface unit 129. The transmission of the modulated intermediate frequency signal from the transmit channel 105 and the baseband processing of the received intermediate frequency signal is synchronous to frequency $f_s$ of a sampling clock generated from a reference clock source 101, for example, 5 MHz or 10 MHz, inside a field programmable gate array (FPGA) of the time interval measurement CDMA transceiver 100. The transmit channel 105 comprises the first mixer 106, the transmission pseudorandom code generation module 107, and the transmission time generation module 108 as disclosed in the detailed description of FIG. 1.

The transmit channel 105 generates the spread signal which is used to binary phase shift keying modulate a carrier signal of frequency, for example, 150 MHz by the binary phase shift keying modulator 128. The transmission pseudorandom code generation module 107 comprises the pseudorandom code generator 107a and the transmission numerically controlled oscillator. The pseudorandom code generator 107a generates the pseudorandom code used to spread the time frame data signal by mixing the generated pseudorandom code with the time frame data signal. Initialization module 125 of the time interval measurement code-division multiple access (CDMA) transceiver 100 executed by the processor 121 programs the transmission pseudorandom code generation module 107 to generate the pseudorandom code. The pseudorandom code generator 107a is a linear feedback shift register (LFSR) based code generator used to generate, for example, an m-sequence or a gold code with auto correlation and cross correlation properties. In an embodiment, the pseudorandom code generator 107a is a memory code based code generator in which the entire sequence of the pseudorandom code is stored in a non-volatile memory in the hardware, or the entire sequence of the code, for example Barker Code, is programmed to a field-programmable gate array (FPGA).

The transmission code numerically controlled oscillator 107b generates the code clock to drive the pseudorandom code generator 107a. The pseudorandom code generator 107a repeats the pseudorandom code with a periodicity known as the code period. The transmission counters 130 count the number of the output chips. The transmission counters 130 comprise a transmission chip counter 134, a transmission code boundary counter 133, a transmission bit counter 132, and a transmission time counter 131. The transmission chip counter 134 upcounts number of chips of the pseudorandom code generated by the pseudorandom code generator 107a. Overflow of the transmission chip counter 134 indicates a code period. The transmission chip counter 134 counts the number of chips output by the pseudorandom code generator 107a. The transmission code boundary counter 133 upcounts the number of the code periods indicated by the overflow of the transmission chip counter 134. Since a bit consists of multiple code boundaries, overflow of the transmission code boundary counter 133 initiates the upcounting of the transmission bit counter 132. The transmission bit counter 132 upcounts number of bits in the time frame data signal. Overflowing of the transmission bit counter 132 indicates completion of transmission of the time frame data signal to the remote ground stations. That is, the overflow of the transmission bit counter 132 indicates completion of transmission of a time frame data signal. The transmission time counter 131 upcounts on completion of the transmission of the time frame data signal to the remote ground stations. In an embodiment the transmission counters 130 are bidirectional counters capable of counting in either the up direction or the down direction through any given count sequence. (Please verify the correctness of the highlighted section.)

The transmission time generation module 108 comprises the transmission counters 130 and a transmission time measurement module 135. The transmission time measurement module 135 computes the transmission time measurement by using the transmit code phase, the number of chips in the transmission chip counter 134, the number of code periods in the transmission code boundary counter 133, the number of bits in the transmission bit counter 132, latched on the generation of the latch measurement signal by the latch epoch generation module 119 in the receive channel 111, and the latched transmission time, that is, number of transmitted frames, in the transmission time counter 131. Typically the bits to be transmitted in a frame are clocked such that one frame takes exactly 1-second to transmit.

The latched transmit code phase, the chip count, the code boundary count and the bit count and the transmit time count together gives the transmission time measurement in the transmit channel 105. Mathematically, the transmission time measurement Tx_time is computed as:

$$Tx\_time = Tx\_frame + Tx\_BitCount*Bit\_period + Tx\_CodeBoundCount*Code\_Period + Tx\_ChipCount*Chip\_Period + *Tx\_CodePhase*Chip\_Period/2^N, \text{ where}$$

Tx_frame is the number of frames transmitted, which correspond to number of seconds in this example, where one frame is of the duration one second, counted in the transmission time counter 131 Tx_BitCount is the number of bits counted in the transmission bit counter 132.
Bit_period is the period of a bit of the time frame data signal.
Tx_CodeBoundCount is the number of code periods counted in the transmission code boundary counter 133.
Code_Period is the code period of the pseudorandom code.
Tx_ChipCount is the number of chips of the pseudorandom code counted in the chip counter.
Chip_Period is the duration of a chip of the pseudorandom code.
Tx_CodePhase is the transmit code phase of the transmission code NCO, ranging between 0 and $2^N-1$.
N is the length of the transmit code phase word.

Figure 6:
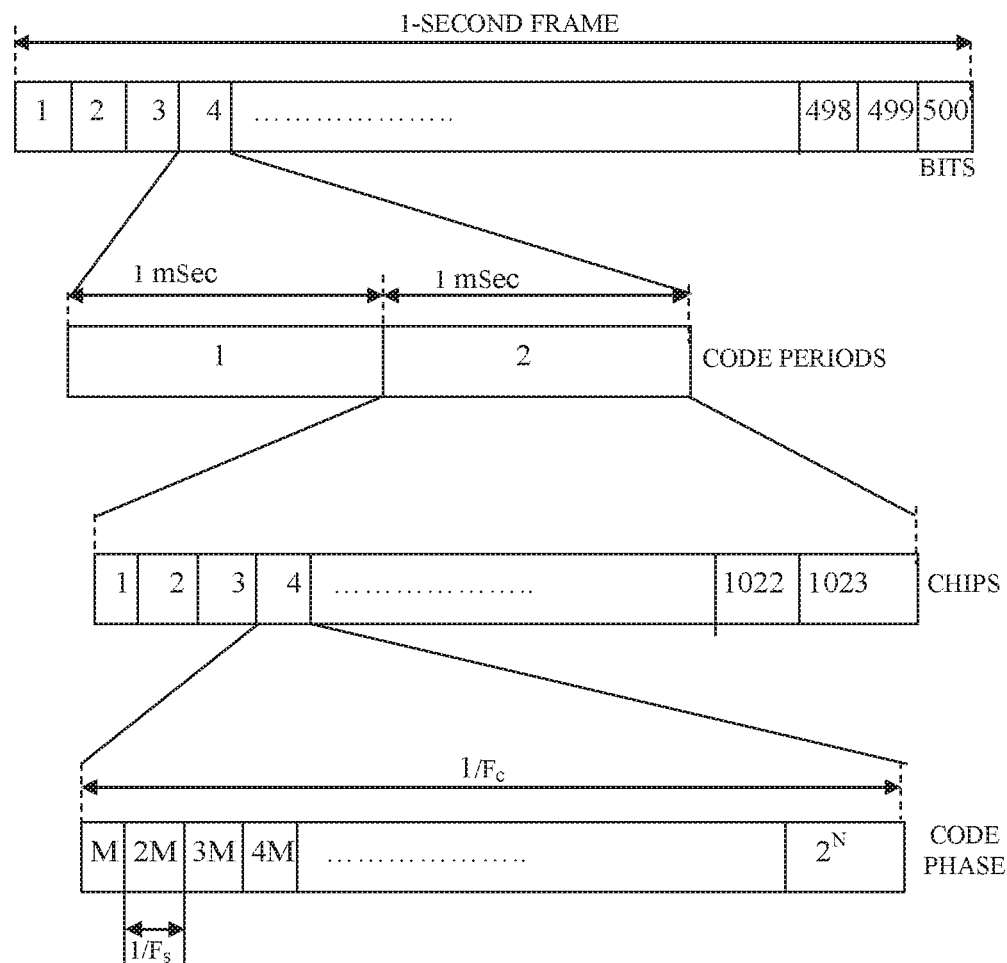
FIG. 6 exemplarily illustrates a structure of a time frame data signal to be transmitted to one or more remote ground stations by the transmit channel that determines length of transmission counters.

The number of bits used for each of the transmission counters 130 depends upon structure of the time frame data signal as exemplarily illustrated in FIG. 6. When the transmission bit counter 132 overflows signifying completion of transmission of the time frame data signal of, for example, 500 bits per second, also indicating completion of 1 second, the transmission time counter 131 upcounts. An initialization module 125 initializes the transmission time counter 131 with a time value in synchronization with a pulse per second signal generated by an external reference time source. Typically, the pulse per second signal is a reference signal latched and synchronized to the external reference time source, for example, 1 pulse per second signal from a global navigation satellite system (GNSS) receiver. The value initialized corresponds to the time traceable to a time standard, for example, Coordinated Universal Time (UTC) or Global Positioning System (GPS) time. The initialization module 125 further initializes, for example, once in a second, a non-transitory computer storage medium, for example, a buffer 110 in the transmit channel 105 with the time frame data bits prior to transmission of the time frame data signal as a modulated intermediate frequency signal and phase synchronizes, for example, using field-programmable gate array (FPGA) logic to start of the time frame data signal and start of a code boundary of the pseudorandom code with a pulse per second signal generated by the external reference time source. In another embodiment, which includes the encryption and hash generation module 109, data from the buffer 110 is further appended with Hash and then encrypted. In either case, the number of bits in the time frame data signal is adjusted if required by appending zeros to ensure that it takes exactly one second for transmission of the frame at the data rate of transmission. The time frame data signal is spread using the pseudorandom code generated by the pseudorandom code generator 107a by multiplication of the time frame data signal and the pseudorandom code in the first mixer 106 and the spread signal from transmit channel 105 is used to binary phase shift keying modulate a carrier signal at intermediate frequency in the binary phase shift keying modulator 128 comprising a digital to analog converter 128a, and an inphase and quadrature phase modulator 128b.

Prior to the receive channel, the external interface unit 129 performs a down conversion of the received radio frequency signal from the remote ground station to the intermediate frequency signal and converts the intermediate frequency signal to the intermediate frequency time data samples.

During tracking, the receive channel 111 first performs a carrier wipe-off by multiplying the digitized intermediate frequency time data samples with a local replica of a carrier signal, generated by the local carrier generator numerically controlled oscillator 114a and uses SINE 114b and COS 114c mapping functions in the second mixers 113a and 113b, to match the incoming carrier signal in the received intermediate frequency signal in both phase and frequency with the local replica of the carrier signal by way of a carrier lock loop. The output of the carrier wipe-off process is the inphase components and the quadrature phase components of the received intermediate frequency time data samples which are dominated by noise. The time frame data signal is buried under the noise until the time frame data signal is collapsed to baseband by a code wipe-off process performed in the I and Q correlators 116. During the code wipe-off process, the inphase components and the quadrature phase components of the received intermediate frequency time data samples are correlated with three arms, that is, early, late and prompt replicas of the replica pseudorandom code synthesized by the reception pseudorandom code generation module 117. In an embodiment, more than three arms of the replica pseudorandom code are used by the I and Q correlators 116. The reception pseudorandom code generation module 117 comprises the reception pseudorandom code generator 117a and the reception code numerically controlled oscillator 117b.

Outputs of the I and Q correlators 116 are sampled by the acquisition and tracking module 112. The acquisition process of the acquisition and tracking module 112 performs the two dimensional pseudorandom code and carrier signal search on the received intermediate frequency time data samples to acquire the received intermediate frequency signal. The output of the acquisition process is a coarse estimate of the code phase of the pseudorandom code and the frequency of the carrier signal of the received intermediate frequency signal. The tracking process of the acquisition and tracking module 112 programs the pseudorandom code generation module 117 and the local carrier generator 114 respectively with acquired code phase and carrier frequency to start tracking process. Thereafter the tracking process of the acquisition and tracking module 112, samples the outputs of the I and Q correlators 116 and updates the reception code numerically controlled oscillator 117b and reception carrier numerically controlled oscillator 113a to periodically align the prompt arm of the replica pseudorandom code and replica carrier frequency in phase and frequency to the phase and frequency of the pseudorandom code and that of carrier signal in the received intermediate frequency time data samples using a code lock loop and a carrier lock loop. The code lock loop in each of the receive channels 111 and 120 offsets frequency of a replica pseudorandom code generated by the receive pseudorandom code generation module, in each of the receive channels 111 and 120, by a code Doppler frequency in order to match with the code frequency in the received intermediate frequency time data samples thereby aligning the replica pseudorandom code in phase and frequency with the incoming received intermediate frequency signal from the remote ground stations. The carrier lock loop in each of the receive channels 111 and 129 offsets the carrier frequency of the replica carrier frequency generated in the local carrier generator 114 by the carrier Doppler frequency to match with the carrier frequency in the received intermediate frequency signal, both in phase and frequency. Though the carrier wipe off and the code wipe off processes are performed simultaneously on the received intermediate frequency signal in real time at a sampling clock rate generated by the clock manager 102, the outputs of the I and Q correlators 116 are sampled by the tracking process of the acquisition and tracking module 112, at a much lower rate and further integrated as per a predetermined predetection integration time. The predetection integration time is less than or equal to a duration of a bit in the time frame data signal. A tracked data processing module 127 in the memory unit 122 executed by the processor 121 performs data bit detection, synchronization, data decoding of the time frame data signal. The decryption and authentication of the decoded bits forming the data is performed by the processor 121 using the decryption and authentication module 115 implemented in field-programmable gate array (FPGA) as a part of the receive channels 111 and 120. In another embodiment, these decryption and authentication algorithms are implemented in the processor 121.

The pseudorandom code generator 117a repeats the replica pseudorandom code with a periodicity known as the code period. The pseudorandom code generator 117a is a linear feedback shift register (LFSR) based code generator. In an embodiment, the pseudorandom code generator 117a is a memory code based code generator. The reception counters 136 comprise a reception chip counter 137, a reception code boundary counter 138, a reception bit counter 139, and a reception time counter 140. The reception chip counter 137 upcounts number of chips of the replica pseudorandom code generated by the pseudorandom code generator 117a in the receive channel 1. Overflow of the reception chip counter 137 indicates a code period. The reception code boundary counter 138 upcounts the number of the code periods of the replica pseudorandom code indicated by the overflow of the reception chip counter 137. The reception bit counter 139 upcounts number of bits in the decoded time frame data signal on overflow of the reception code boundary counter 138. Overflowing of the reception bit counter 139 indicates completion of reception of the time frame data signal from the remote ground station. The reception time counter 140 upcounts on completion of the reception of the time frame data in the intermediate frequency signal from the remote ground stations via the external interface unit 129. In an embodiment, the initialization module 125 initializes the reception time counter 140 in the receive channel 111 in accordance with the time information in the decoded time frame data signal. The reception time counter 140 upcounts further whenever the reception bit counter 139 overflows indicating completion of reception of a time frame data signal. In an embodiment the reception counters 136 and transmission counters 130 are implemented as down counters. In this embodiment the counters reloaded with maximum expected count value when the counters counts down to zero. The zero value of the counters is used as the signal to start down count the next counter.

The reception time generation module 118 comprises the reception counters 136 and a reception time measurement module 141. The reception time measurement module 141 computes the reception time measurement by using the receive code phase, the number of chips in the reception chip counter 137, the number of code periods in the reception code boundary counter 138, and the number of bits in the reception bit counter 139 latched on the generation of the latch measurement signal by the latch epoch generation module 119.

The latch epoch generation module 119 generates the latch measurement signal on overflow of the reception chip counter 137, the reception code boundary counter 138, or the reception bit counter 139 for generating the transmission time measurement of the transmit channel 105 and the reception time measurement of the receive channel. The latched transmit code phase, the chip count, the code boundary count and the bit count in the reception code numerically controlled oscillator 117b and the reception counters 136 together gives the reception time measurement in the receive channel 111. Mathematically, the transmission time measurement Rx_time is computed as:

$$Rx\_time = Rx\_frame + Rx\_BitCount*Bit\_period + Rx\_CodeBoundCount*Code\_Period + Rx\_ChipCount*Chip\_Period + Rx\_CodePhase*Chip\_Period/2^N,\text{ where}$$

Rx_frame is the number of frames, which correspond to number of seconds in this example, where one frame is of the duration one second, counted in the reception time counter 140.
Rx_BitCount is the number of bits of the intermediate frequency time data samples counted in the reception bit counter 139.
Bit_period is the period of a bit of the intermediate frequency time data samples.
Rx_CodeBoundCount is the number of code periods counted in the reception code boundary counter 138.
Code_Period is the code period of the replica pseudorandom code.
Rx_ChipCount is the number of chips of the replica pseudorandom code counted in the reception chip counter 137.
Chip_Period is the duration of a current chip of the pseudorandom code compensated for the code Doppler.
Rx_CodePhase is the receive code phase of the transmission code NCO of length N expressed as a binary number.
N is the length of the receive code phase word.

The time interval measurement module 123 computes difference between the time information in the transmitted radio frequency signal and the received radio frequency signal by determining a difference between the computed transmission time measurement and the computed reception time measurement as time interval measurement TIC_Measurement:

$$TIC\_Measurement = Tx\_time - Rx\_time$$

The time interval transmission module 124 transmits the computed time interval measurement to the remote ground station based on a station identifier present in the received intermediate frequency signal via a dedicated wired link or a wireless link between the remote ground station and the central ground station.

The time interval measurement code-division multiple access (CDMA) transceivers 100 at each of the participating ground stations involved in two-way satellite time and frequency transfer (TWSTFT) transmit binary phase shift keying modulated signal containing pseudorandom codes. The digital phase modulation is synchronous with a local clock in the time interval measurement CDMA transceiver 100. In an embodiment, the time interval measurement CDMA transceiver 100 at a central ground station generates 1-pulse per second (1-PPS) epoch synchronous with the generated spread signal in the transmit channel 105 of the central ground station which is indicative of the periodic 1-second epoch of the time maintained at the central ground station. In this embodiment, the receive channel 111 of the time interval measurement CDMA transceiver 100 correlates an incoming binary phase shift keying modulated signal with a replica pseudorandom code and regenerates the 1-PPS epoch of the remote ground station that transmitted the binary phase shift keying modulated signal. The time interval measurement module 123 of the time interval measurement CDMA transceiver 100 determines time difference between 1-PPS epoch transmitted from the transmit channel 105 and the 1_PPS epoch regenerated in the receive channel 111 using a dedicated time interval counter. The time interval measurements are generated by taking the difference of simultaneously latched phases of the transmission code numerically controlled oscillator 107b and the reception code numerically controlled oscillator 117b used to generate the pseudorandom code in the transmit channel 105 and the replica pseudorandom code in the receive channel 111, at a demodulated 1-PPS epoch regenerated in the receive channel 111. The central ground station and the remote ground station periodically exchange the time difference for calculating time offset between the central ground station and the remote ground station.

The time interval measurement code-division multiple access (CDMA) transceiver 100 disclosed herein provides an improvement in two-way satellite time and frequency transfer (TWSTFT) and satellite ranging applications as follows. The CDMA transceiver 100 has a theoretical measurement resolution of the order of 2e-16 seconds for a chipping rate Fc of 1.023 MHz and 32 bit NCOs, given by $1/(Fc*2^{32})$ in both the transmit channel 105 and each of the receive channels 111 and 120. The function of the time interval counter is implemented as a part of the signal generation and modulation of the intermediate frequency signal and demodulation and digital signal processing of the received intermediate frequency signal. The number of programmable parallel receive channels 111 and 120 for receiving time information from remote ground stations is increased and simultaneous high resolution time interval measurements for each of the receive channels 111 and 120 are feasible. Therefore, the hardware size of the CDMA transceiver 100 for time interval measurements is reduced and lower power consumption by the time interval measurement CDMA transceiver 100 for multiple receive channels 111 and 120 is achieved.

FIG. 3 exemplarily illustrates a high level architectural diagram of an embodiment of the time interval measurement code-division multiple access (CDMA) transceiver 100 comprising a transmit channel 105 and a receive channel 111 implemented on a field programmable gate array (FPGA) 104. As exemplarily illustrated, the FPGA 104 is communicatively coupled to the processor 121, the memory unit 122, binary phase shift keying modulator 128, and the external interface unit 129. The processor 121 functions in synchronous with a processor clock 142 and the FPGA 104, the binary phase shift keying modulator 128, and the external interface unit 129 function in synchronous with the clock manager 102 in the FPGA. The binary phase shift keying modulator 128 generates the modulated intermediate frequency signal that is, further, passed through an intermediate frequency filter and frequency up-converter 143 for conversion to a radio frequency signal to be transmitted to remote ground station via an external interface. The intermediate frequency filter of the intermediate frequency filter and frequency converter 143 restricts bandwidth of the modulated intermediate frequency signal to an allocated bandwidth. The receive channel 111 receives the intermediate frequency time data samples from the external interface unit 129. The external interface unit 129 receives the radio frequency signal from the remote ground station via an external interface. The external interface unit 129 comprises a radio frequency filter and frequency down converter 129a that filters and down converts the received radio frequency signal to the intermediate frequency signal, an analog to digital converter 129b that converts the down converted intermediate frequency signal to the intermediate frequency time data samples.

In an embodiment, the transmit channel 105 comprises a carrier mixer for multiplying the generated spread signal with an intermediate frequency carrier signal generated using a carrier signal generator, and a sine and cosine lookup. The output of the carrier mixer is up converted using a frequency up-converter and transmitted as a radio frequency signal to the remote ground station. In this embodiment, the binary phase shift keying modulator 128 is absent and the binary phase shift keying modulator 128 and the intermediate frequency filter are replaced by the carrier mixer.

Figure 4:
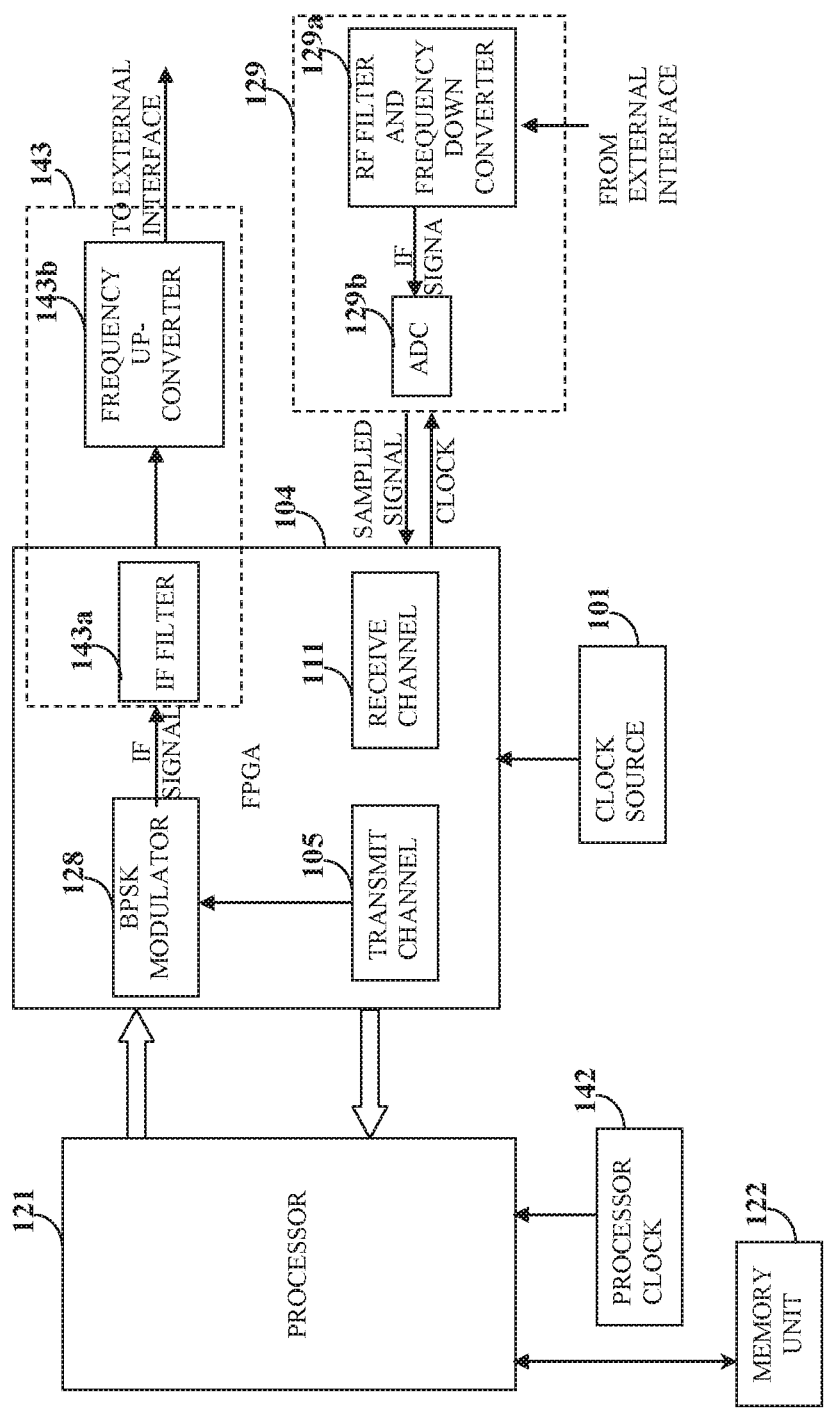
FIG. 4 exemplarily illustrates a high level architectural diagram of an embodiment of the time interval measurement transceiver comprising a transmit channel, a receive channel, an intermediate frequency filter, and a binary phase shift keying modulator implemented on a field programmable gate array.

FIG. 4 exemplarily illustrates a high level architectural diagram of an embodiment of the time interval measurement code-division multiple access (CDMA) transceiver 100 comprising a transmit channel 105, a receive channel 111, an intermediate frequency filter 143a, and a binary phase shift keying modulator 128 implemented on a field programmable gate array (FPGA) 104. The intermediate frequency filter 143a and frequency converter exemplarily illustrated in FIG. 3 is partially implemented on the FPGA 104. The binary phase shift keying modulator 128 and the intermediate frequency filter 143a are implemented on the FPGA 104 and the frequency up-converter 143b is communicatively coupled to the FPGA 104. The external interface unit 129 is communicatively coupled to the FPGA 104.

Figure 5:
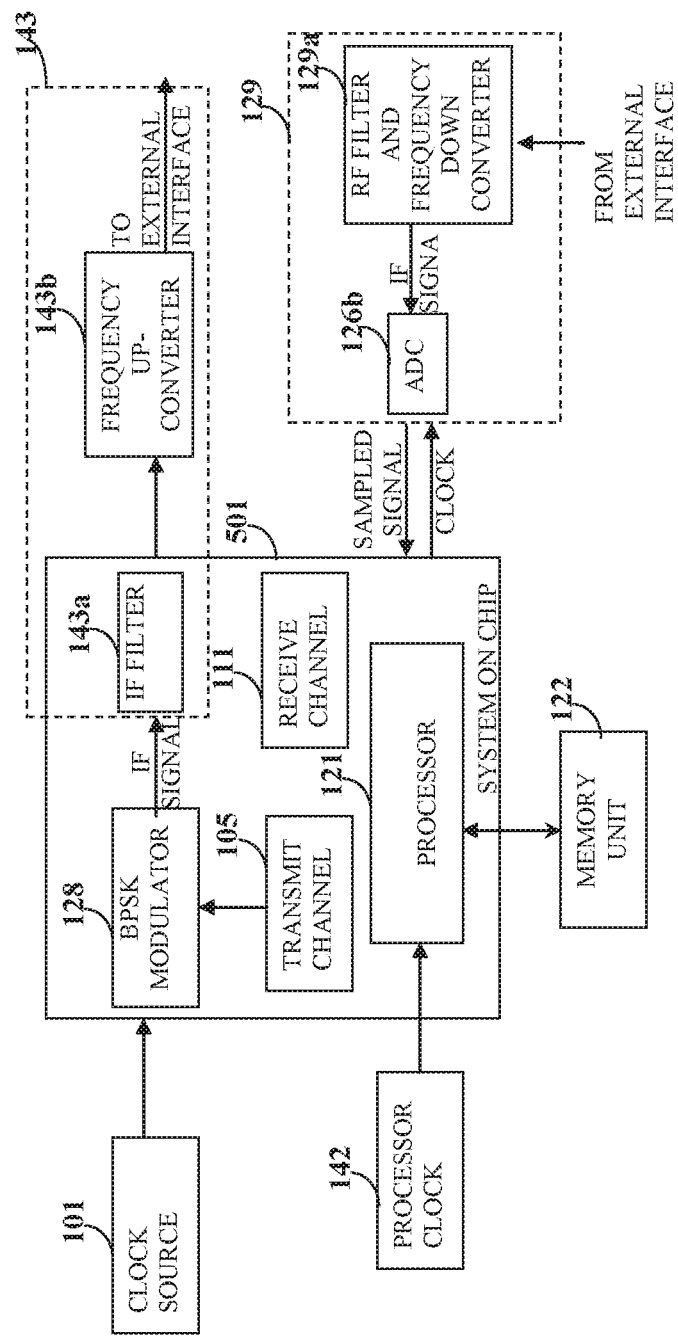
FIG. 5 exemplarily illustrates a high level architectural diagram of an embodiment of the time interval measurement transceiver comprising a processor, a transmit channel, a receive channel, an intermediate frequency filter, and a binary phase shift keying modulator implemented on a chip.

FIG. 5 exemplarily illustrates a high level architectural diagram of an embodiment of the time interval measurement code-division multiple access (CDMA) transceiver 100 comprising a processor 121, a transmit channel 105, a receive channel 111, an intermediate frequency filter 143a, and a binary phase shift keying modulator 128 implemented on a chip 501. The binary phase shift keying modulator 128 and the intermediate frequency filter 143a are implemented on the chip 501 along with the processor 121 and the memory unit 122 and the frequency-up converter 143b are communicatively coupled to the chip 501. The external interface unit 129 is communicatively coupled to the chip 501.

FIG. 6 exemplarily illustrates a structure of a time frame data signal to be transmitted to one or more remote ground stations by the transmit channel 105 that determines length of the transmission counters 130. As exemplarily illustrated, the time frame data signal of 1-second period consists of 500 bits. That is, the transmit channel 105 transmits the time frame data signal at a rate of 500 bits/second. This results in transmission of 1 bit in 2 milliseconds. Therefore, each bit of the time frame data signal is of 2 code periods of the pseudorandom code generated by the transmission pseudorandom code generation module 107. A code period of the pseudorandom code is 1 millisecond and the transmission pseudorandom code generation module 107 generates the pseudorandom code of 1023 chips with periodicity of 1 millisecond as a chipping rate of the transmission pseudorandom code generation module 107 is 1.023 MHz, that is, 1023000 chips per second. The transmission pseudorandom code generation module 107 comprising a LFSR based code generator clocked at 1.023 MHz from a transmission code numerically controlled oscillator 107b generates 1023 chips for every 1 millisecond.

Based on the structure of the time frame data signal, the length of the transmission counters 130 is selected. Therefore, for 1023 chips of the pseudorandom code, a chip counter of 10 bits length is sufficient. The length of the code boundary counter is 1 bit and the length of the bit counter is 9 bits. Furthermore, the bit counter is required to count only upto 500 bits instead of 512 bits that a 9-bit counter can count upto, extra decoding logic is required to decode the counter state when it upcounts to 500. The output of decoding logic is a signal that upcounts the time counter. For generating the pseudorandom code of 1023 chips at a chipping rate $F_c$ of 1.023 MHz from a sampling clock of $F_s$ Hz, the code phase increment word of the code numerically controlled oscillator 107b is required to be incremented by $F_c/F_s*2^N$ counts every sampling clock. The length of the transmit and correspondingly the receive code NCO length N is chosen depending on the desired code phase resolution which is given by $(1/(2^N*F_c))$ seconds. Therefore for a code phase measurement resolution of 2e-16 seconds, N is rounded off to a value of 32

Consider an example where a time frame data signal exemplarily illustrated in FIG. 6 is being transmitted to a remote ground station by the transmit channel 105. The transmit channel 105 generates the transmission time measurement on reception of a latch measurement signal generated by the latch epoch generation module 119. Consider the latch measurement signal is generated when $4^{th}$ bit of the time frame data signal is being transmitted and the time frame data signal is transmitted for the eighth time. The value of the number of seconds corresponding to one second per frame is counted in the transmission time counter 131, Tx_frame is 7 seconds since the transmission time counter 131 upcounts on completion of transmission of the time frame data signal. Until the latch measurement signal is received, the number of bits counted in the transmission bit counter 132, Tx_BitCount is 3. The period of a bit of the time frame data signal, Bit_period is 2 millisecond as exemplarily illustrated in FIG. 6. Consider that the number of code periods counted in the transmission code boundary counter 133, Tx_CodeBoundCount is 0. The code period of the pseudorandom code is 1 millisecond. Consider the number of chips of the pseudorandom code counted in the chip counter is 520. The duration of a chip of the pseudorandom code is 1/1.023e6 seconds. Consider the transmit code phase of the transmission code numerically controlled oscillator 107b is 12345. The transmission time measurement is, therefore, given as:

$$Tx\_time = Tx\_frame + Tx\_BitCount * Bit\_period + \\ Tx\_CodeBoundCount * Code\_Period + \\ Tx\_ChipCount * Chip\_Period + \\ Tx\_CodePhase * Chip\_Period / 2^N$$

$$Tx\_time = 7 + 3*2e{-}3 + 0*1e{-}3 + 520*(1/1.023e6) + 12345* \\ (1/1.023e6)/2^{32}$$

Similarly, the reception time measurement Rx_time is generated by the receive channel 11 as disclosed in the detailed description of FIG. 2. The Chip_Period to be considered in the Rx_Time calculation needs to be accounted for the code Doppler frequency. The time interval measurement module 123 then computes the difference between the transmission time measurement and the reception time measurement.

FIG. 7 exemplarily illustrates a timing diagram showing latching of transmit code phase words and receive code phase words by the transmit channel 105 and the receive channel 111 of the time interval measurement code-division multiple access (CDMA) transceiver 100 on generation of the latch measurement signal in the receive channel 111 for the structure of the time frame data signal exemplarily illustrated in FIG. 6. The latch measurement signal is generated by the latch epoch generation module 119, for example, on overflow of the reception chip counter 137 on upcounting upto 1023 chips. The time instant at which the latch measurement signal is generated is indicated as a "latch instant TOL" in FIG. 7. The transmission chip counter 134 and the reception chip counter 137 upcounts upto 1023 chips and then overflows. The transmit code phase and the receive code phase increase upto $2^N$ for every chip of the pseudorandom code and the replica pseudorandom code. The time of arrival of the actual signal indicated as "TOA" in the receive channel 111, may lie anywhere between two sampling instants. But the receive code phase overflows above $2^N$ and rolls over to a new receive code phase value only at the next sampling instant The roll-over of chip count in the reception chip counter 137 from 1023 to 1, also happens at the next sampling instant. This sampling instant is the "Latch instant and indicated by "TOL" the time of latch. The delay in latching of the reception measurement in the receive channel 111 given by TOL-TOA, is the same in both the transmit channel 105 and the receive channel 111. Therefore, when a difference between the transmit code phases and the receive code phases is taken, the common offset of TOL-TOA gets removed giving a very accurate measure of time difference between the transmission time measurement and the receive time measurement. Since the difference of the transmit code phases and the receive code phases is taken, the precision of the transmission time measurement and the reception time measurement is of the order of $1/(Fc*2^N)$, where Fc is the chipping rate of the pseudorandom code and the replica pseudorandom code and N is the length of the transmit code phase word and the receive code phase word. In another embodiment, the length of the transmit and receive code NCOs could be different from each other. The time interval measurement, exemplarily illustrated in FIG. 7, is generated as half of the difference between the transmission time measurement (Tx_time) and the reception time measurement (Rx_time).

$$TIC_{measured} = (Tx\_time_{Tx} - Rx\_time_{Rx})/2$$

The Tx_time $_{Tx}$ and Rx_time $_{Rx}$ are the latched code phases of the transmit channel and receive channels respectively, as exemplarily illustrated in FIG. 7.

Figure 8A:
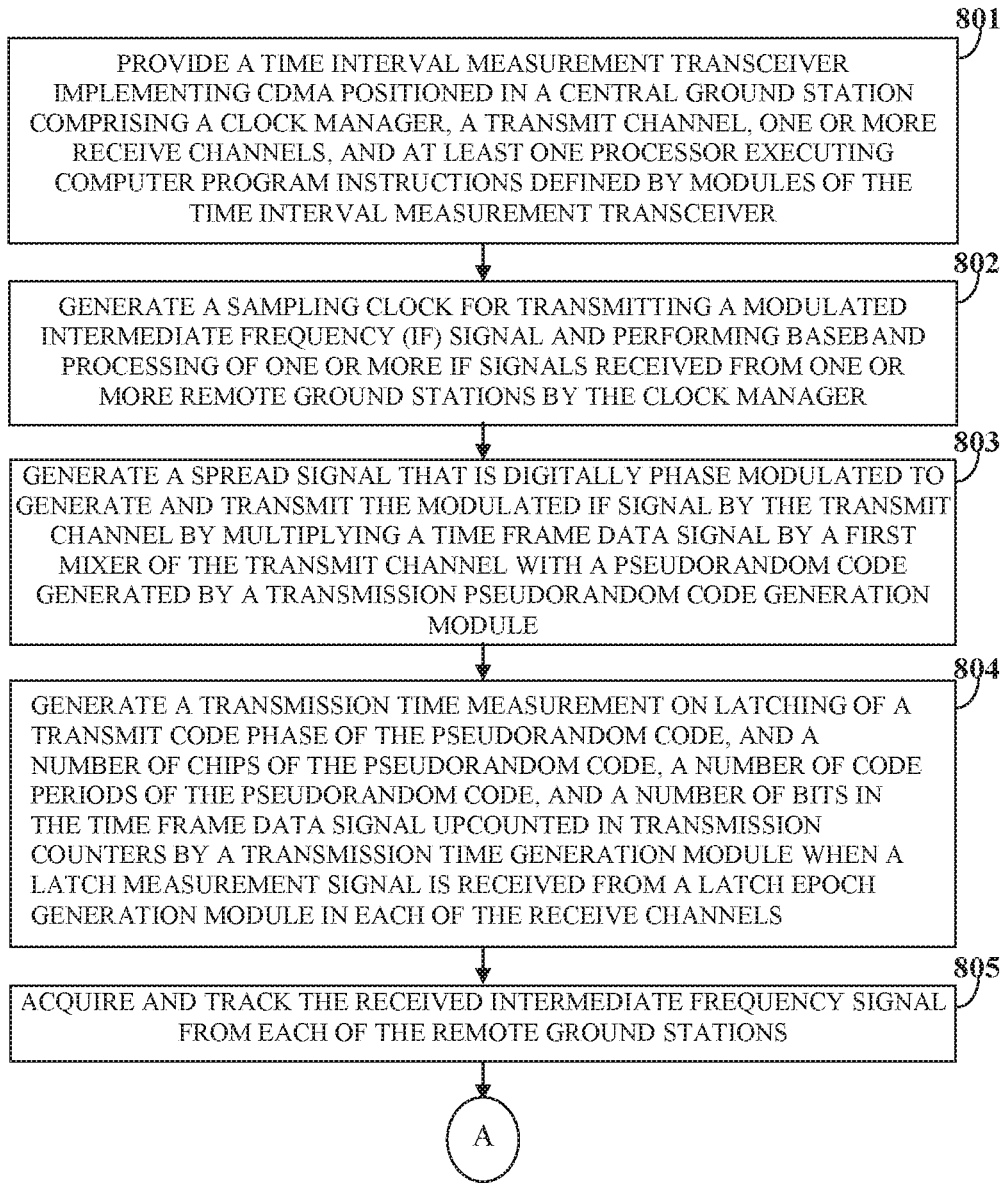
FIGS. 8A-8B illustrate a method for performing for performing two-way satellite time and frequency transfer and satellite ranging.
Figure 8B:
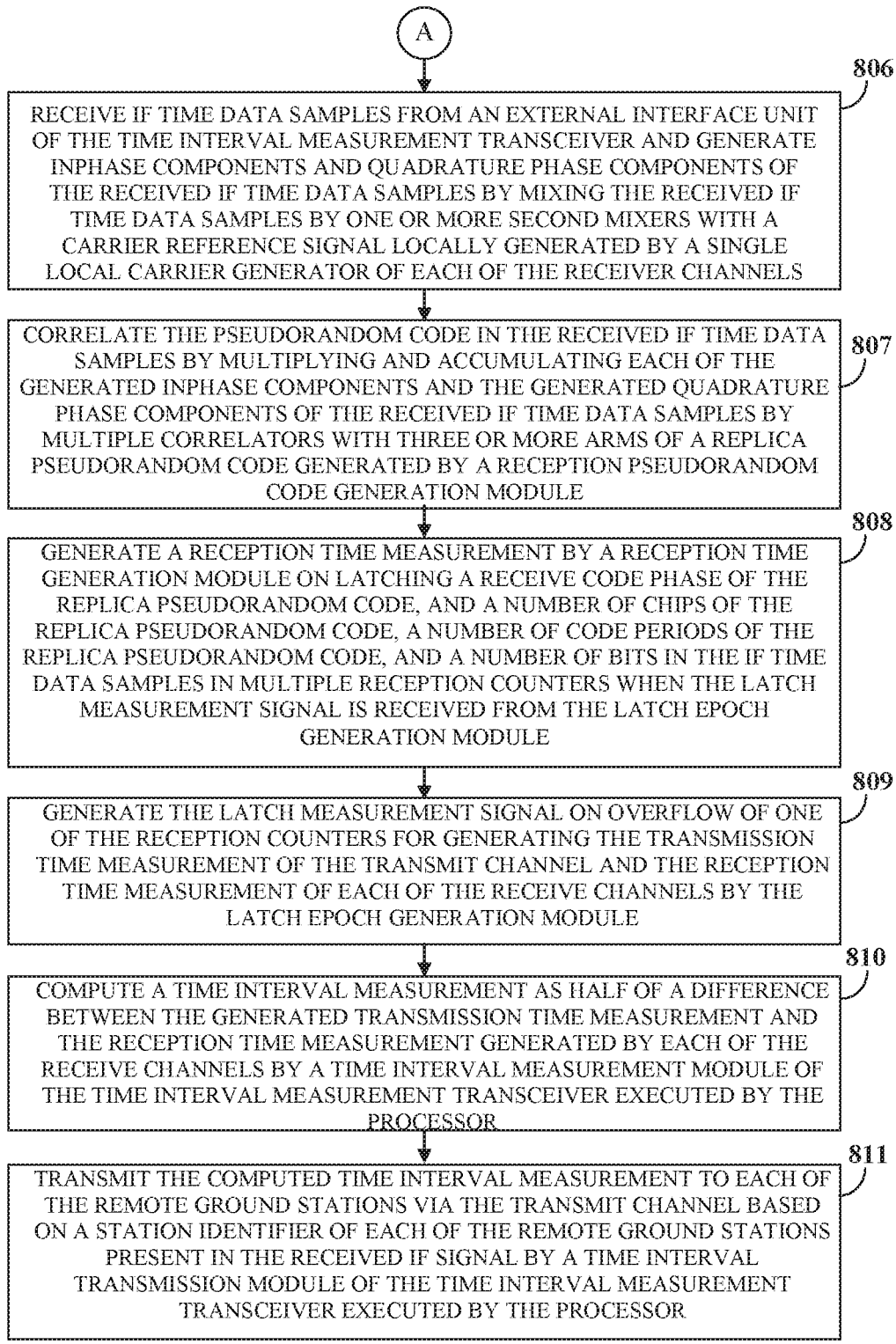

FIGS. 8A-8B illustrate a method for performing two-way satellite time and frequency transfer and satellite ranging continuously. In the method disclosed herein, a time interval measurement transceiver 100 implementing code-division multiple access (CDMA), positioned in a central ground station comprising a clock manager 102, a transmit channel 105, multiple receive channels 111 and 120, and at least one processor 121 executing computer program instructions defined by modules 123, 124, 125, 126, and 127 of the time interval measurement transceiver 100 is provided 801. The clock manager 102 generates 802 a sampling clock for transmitting a modulated intermediate frequency signal and performing baseband processing of one or more intermediate frequency signals received from one or more remote ground stations. A first mixer 106 of the transmit channel 105 generates 803 a spread signal that is digitally phase modulated to generate and transmit the modulated intermediate frequency signal by multiplying a time frame data signal with a pseudorandom code generated by a transmission pseudorandom code generation module 107 in the transmit channel 105.

A transmission time generation module 108 generates 804 a transmission time measurement on latching of a transmit code phase of the pseudorandom code, and a number of chips of the pseudorandom code, a number of code periods of the pseudorandom code, and a number of bits in the time frame data signal upcounted in transmission counters 130 when a latch measurement signal is received from a latch epoch generation module 119 in each of the receive channels 11 and 120. In each of the receive channels 111 and 120, an acquisition and tracking module 112 in each of the receive channels 111 and 120 acquires and tracks 805 received intermediate frequency signal from each of the remote ground stations. One or more second mixers 113a and 113b receive 806 intermediate frequency time data samples from an external interface unit 129 of the time interval measurement CDMA transceiver 100 and generate inphase components and quadrature phase components of the received intermediate frequency time data samples by mixing the received intermediate frequency time data samples with a carrier reference signal locally generated by a single local carrier generator 114. Multiple correlators 116 in each of the receive channels 111 and 120 correlate 807 the pseudorandom code in the received intermediate frequency time data samples during tracking, by multiplying and accumulating each of the generated inphase components and the generated quadrature phase components of the received intermediate frequency time data samples by multiple correlators 116 with three or more arms of a replica pseudorandom code generated by a reception pseudorandom code generation module 117.

In each of the receive channels 111 and 120, a reception time generation module 118 generates 808 a reception time measurement on latching a receive code phase of the replica pseudorandom code, and a number of chips of the replica pseudorandom code, a number of code periods of the replica pseudorandom code, and a number of bits in the intermediate frequency time data samples in multiple reception counters 136 when the latch measurement signal is received from the latch epoch generation module 119 of the corresponding receive channel. The latch epoch generation module 119 generates 809 the latch measurement signal on overflow of one of the reception counters 136 for generating the transmission time measurement of the transmit channel 105 and the reception time measurement of each of the receive channels 111 and 120.

A time interval measurement module 123 of the time interval measurement code-division multiple access (CDMA) transceiver 100 executed by the processor 121 computes 810 a time interval measurement as half of a difference between the generated transmission time measurement and the reception time measurement generated by each of the receive channels 111 and 120. A time interval transmission module 124 of the time interval measurement CDMA transceiver 100 executed by the processor 121 transmits 811 the computed time interval measurement to each of the remote ground stations via the transmit channel 105 based on a station identifier of each of the remote ground stations present in the received intermediate frequency signal via a dedicated wired link or a wireless link between each of the remote ground stations and the central ground station.

The foregoing examples have been provided merely for explanation and are in no way to be construed as limiting of the method and the time interval measurement code-division multiple access (CDMA) transceiver 100 disclosed herein. While the method and time interval measurement CDMA transceiver 100 have been described with reference to various embodiments, it is understood that the words, which have been used herein, are words of description and illustration, rather than words of limitation. Furthermore, although the method and the time interval measurement CDMA transceiver 100 have been described herein with reference to particular means, materials, and embodiments, the method and the time interval measurement CDMA transceiver 100 are not intended to be limited to the particulars disclosed herein; rather, the method and the time interval measurement CDMA transceiver 100 extend to all functionally equivalent structures, methods and uses, such as are within the scope of the appended claims. While multiple embodiments are disclosed, it will be understood by those skilled in the art, having the benefit of the teachings of this specification, that the method and the time interval measurement CDMA transceiver 100 disclosed herein are capable of modifications and other embodiments may be effected and changes may be made thereto, without departing from the scope and spirit of the method and the time interval measurement CDMA transceiver 100 disclosed herein.

We claim:

1. A time interval measurement transceiver implementing code division multiple access, positioned in a central ground station for performing two-way satellite time and frequency transfer and satellite ranging, said time measurement transceiver comprising:
    a clock manager for generating a sampling clock for transmitting a modulated intermediate frequency signal and performing baseband processing of an intermediate frequency signal received from one or more remote ground stations;
    a transmit channel operably coupled to said clock manager for generating a spread signal that is digitally phase modulated to generate and transmit said modulated intermediate frequency signal, said transmit channel comprising:
        a first mixer operably coupled to a transmission pseudorandom code generation module for generating said spread signal by multiplying a time frame data signal with a pseudorandom code generated by said transmission pseudorandom code generation module; and
        a transmission time generation module for generating a transmission time measurement on latching of a transmit code phase of said pseudorandom code, and a number of chips of said pseudorandom code, a number of code periods of said pseudorandom code, and a number of bits in said time frame data signal upcounted in a plurality of transmission counters when a latch measurement signal is received from a latch epoch generation module in each of receive channels;
    said receive channels operably coupled to said clock manager, each of said receive channels comprising:
        an acquisition and tracking module for acquiring and tracking said intermediate frequency signal received from said one or more remote ground stations;
        one or more second mixers for receiving intermediate frequency time data samples from an external interface unit and generating inphase components and quadrature phase components of said received intermediate frequency time data samples by mixing said received intermediate frequency time data samples with a carrier reference signal locally generated by a local carrier generator of each of said receive channels, wherein said intermediate frequency time data samples correspond to said received intermediate frequency signal;
        a plurality of correlators for correlating a pseudorandom code in said received intermediate frequency time data samples by multiplying and accumulating each of said generated inphase components and said generated quadrature phase components of said received intermediate frequency time data samples with three or more arms of a replica pseudorandom code generated by a reception pseudorandom code generation module;
        a reception time generation module for generating a reception time measurement on latching a receive code phase of said replica pseudorandom code, and a number of chips of said replica pseudorandom code, a number of code periods of said replica pseudorandom code, and a number of bits in said intermediate frequency time data samples in a plurality of reception counters when said latch measurement signal is received from said latch epoch generation module; and
        said latch epoch generation module for generating said latch measurement signal on overflow of one of said reception counters for generating said transmission time measurement of said transmit channel and said reception time measurement of each of said receive channels; and
    at least one processor communicatively coupled to said clock manager, said transmit channel, and said receive channels, said processor configured to execute computer program instructions defined by modules of said time interval measurement transceiver, said modules of said time interval measurement transceiver comprising:
        a time interval measurement module for computing a time interval measurement as half of a difference between said generated transmission time measurement and said reception time measurement generated by each of said receive channels; and a time interval transmission module for transmitting said computed time interval measurement to each of said remote ground stations via said transmit channel based on a station identifier of each of said remote ground stations via one of a dedicated wired link and a wireless link.

2. The time interval measurement transceiver of claim 1, wherein said transmission time generation module comprises:

said transmission counters comprising:

a transmission chip counter for upcounting a number of chips of said pseudorandom code generated by said transmission pseudorandom code generation module operating at said sampling clock, wherein an overflow of said transmission chip counter indicates a code period;

a transmission code boundary counter for upcounting a number of code periods indicated by said overflow of said transmission chip counter;

a transmission bit counter for upcounting a number of bits in said time frame data signal, wherein an overflow of said transmission bit counter indicates completion of transmission of said time frame data signal to said remote ground stations; and a transmission time counter for upcounting on said completion of said transmission of said time frame data signal to said remote ground stations; and a transmission time measurement module for computing said transmission time measurement by using said latched transmit code phase, a latched number of chips in said transmission chip counter, a latched number of code periods in said transmission code boundary counter, a latched number of bits in said transmission bit counter and a latched transmission time in said transmission time counter.

3. The time interval measurement transceiver of claim 2, wherein said modules executed by said at least one processor further comprise an initialization module for initializing said transmission time counter with a time value in synchronization with a pulse per second signal generated by an external reference time source, wherein said initialization module programs said transmission pseudorandom code generation module to generate said pseudorandom code, and wherein said initialization module programs said reception pseudorandom code generation module to generate said replica pseudorandom code.

4. The time interval measurement transceiver of claim 3, where said initialization module further initializes a non-transitory computer readable storage medium of said time interval measurement transceiver with time frame data bits of said time frame data signal prior to transmission of said time frame data signal as said modulated intermediate frequency signal, and phase synchronizes start of said time frame data signal and start of a code boundary of said pseudorandom code with a pulse per second signal generated by said external reference time source.

5. The time interval measurement transceiver of claim 1, wherein said reception time generation module comprises:

said reception counters of each of said receive channel comprises:

a reception chip counter for upcounting a number of chips of said replica pseudorandom code generated by said reception pseudorandom code generation module;

a reception code boundary counter for upcounting a number of code periods of said replica pseudorandom code indicated by overflow of said reception chip counter;

a reception bit counter for upcounting a number of bits of a frame in said intermediate frequency time data samples, wherein an overflow of said reception bit counter indicates completion of reception of time frame data; and a reception time counter for upcounting on completion of said reception of said time frame data; and a reception time measurement module for computing said reception time measurement by using said latched receive code phase of said replica pseudorandom code, a latched number of chips in said reception chip counter, a latched number of code periods in said reception code boundary counter, a latched number of bits in said reception bit counter, and a latched reception time in said reception time counter.

6. The time interval measurement transceiver of claim 5, wherein said latch epoch generation module generates said latch measurement signal on overflow of one of said reception chip counter, said reception code boundary counter, and said reception bit counter for generating said transmission time measurement of said transmit channel and said reception time measurement of each of said receive channels.

7. The time interval measurement transceiver of claim 1, further comprising a binary phase shift keying modulator communicatively coupled to said transmit channel for digital phase modulation of said generated spread signal and generating said modulated intermediate frequency signal to be transmitted to each of said remote ground stations via an intermediate frequency filter and a frequency up-converter.

8. The time interval measurement transceiver of claim 1, further comprising a carrier mixer for multiplying and up converting said generated spread signal with an intermediate frequency carrier signal generated using a carrier signal generator, a sine and cosine lookup and a frequency up-converter and transmitting a radio frequency signal to each of said remote ground stations.

9. The time interval measurement transceiver of claim 1, wherein said external interface unit comprises a radio frequency filter and a frequency down converter for conversion of a radio frequency signal received from said one or more remote ground stations to said intermediate frequency signal.

10. The time interval measurement transceiver of claim 1, wherein said latch epoch generation module generates said latch measurement signal for generating said transmission time measurement of said transmit channel and said reception time measurement of one of said receive channels independent of another of said receive channels.

11. The time interval measurement transceiver of claim 1, wherein said modules executed by said at least one processor further comprise a ranging module for said satellite ranging by measuring time required for said modulated intermediate frequency signal to traverse a path to and from a satellite and converting said measured time to a distance between said satellite and said time interval measurement transceiver using a formula:

(distance between said satellite and said time interval measurement transceiver)=[(measured time) *(a velocity of light)]/2.

12. The time interval measurement transceiver of claim 1, wherein said transmit channel further comprises an encryption and hash generation module for encrypting said time frame data signal and each of said receive channels further comprises a decryption and authentication module for decrypting and authenticating said time frame data signal.

13. The time interval measurement transceiver of claim 1, wherein said transmission pseudorandom code generation module and said reception pseudorandom code generation module further comprise pseudorandom code generators respectively, wherein said pseudorandom code generators are one of a linear feedback shift register based code generator and a programmable memory code based code generator.

14. A method for performing time interval measurement in two-way satellite time and frequency transfer and satellite ranging, said method comprising:
   providing a time interval measurement transceiver implementing code division multiple access, positioned in a central ground station comprising:
   a clock manager;
   a transmit channel comprising a first mixer, a transmission pseudorandom code generation module, and a transmission time generation module;
   a plurality of receive channels, each of said receive channels comprising one or more second mixers, an acquisition and tracking module, a plurality of correlators, a reception pseudorandom code generation module, a reception time generation module, and a latch epoch generation module; and
   at least one processor executing computer program instructions defined by modules of said time interval measurement transceiver;
   generating a sampling clock for transmitting a modulated intermediate frequency signal and performing baseband processing of an intermediate frequency signal received from one or more remote ground stations by said clock manager;
   generating a spread signal that is digitally phase modulated to generate and transmit said modulated intermediate frequency signal by said transmit channel by multiplying a time frame data signal by said first mixer of said transmit channel with a pseudorandom code generated by said transmission pseudorandom code generation module;
   generating a transmission time measurement on latching of a transmit code phase of said pseudorandom code, and a number of chips of said pseudorandom code, a number of code periods of said pseudorandom code, and a number of bits in said time frame data signal upcounted in a plurality of transmission counters by said transmission time generation module when a latch measurement signal is received from said latch epoch generation module in each of said receive channels;
   acquiring and tracking said received intermediate frequency signal by said acquisition and tracking module;
   receiving intermediate frequency time data samples from an external interface unit of said time interval measurement transceiver and generating inphase components and quadrature phase components of said received intermediate frequency time data samples by mixing said received intermediate frequency time data samples in said one or more second mixers with a carrier reference signal locally generated by a local carrier generator of each of said receiver channels;
   correlating a pseudorandom code in said received intermediate frequency time data samples by multiplying and accumulating each of said generated inphase components and said generated quadrature phase components of said received intermediate frequency time data samples by said plurality of correlators with three or more arms of a replica pseudorandom code generated by said reception pseudorandom code generation module;
   generating a reception time measurement by said reception time generation module on latching a receive code phase of said replica pseudorandom code, and a number of chips of said replica pseudorandom code, a number of code periods of said replica pseudorandom code, and a number of bits in said intermediate frequency time data samples in a plurality of reception counters when said latch measurement signal is received from said latch epoch generation module;
   generating said latch measurement signal on overflow of one of said reception counters for generating said transmission time measurement of said transmit channel and said reception time measurement of each of said receive channels by said latch epoch generation module;
   computing a time interval measurement as half of a difference between said generated transmission time measurement and said reception time measurement generated by each of said receive channels, by a time interval measurement module of said time interval measurement transceiver executed by said at least one processor; and
   transmitting said computed time interval measurement to each of said remote ground stations via said transmit channel based on a station identifier of each of said remote ground stations via one of a dedicated wired link and a wireless link by a time interval transmission module of said time interval measurement transceiver executed by said at least one processor.

15. The method of claim 14, wherein said generating of a transmission time measurement by said transmission time generation module comprises:
   upcounting a number of chips of said pseudorandom code generated by said transmission pseudorandom code generation module operating at said sampling clock by a transmission chip counter of said transmission counters, wherein an overflow of said transmission chip counter indicates a code period;
   upcounting a number of code periods indicated by said overflow of said transmission chip counter by a transmission code boundary counter of said transmission counters;
   upcounting a number of bits in said time frame data signal by a transmission bit counter of said transmission counters, wherein an overflow of said transmission bit counter indicates completion of transmission of said time frame data signal to said remote ground stations;
   upcounting a transmission time counter of said transmission counters on said completion of said transmission of said time frame data signal to said remote ground stations, and
   computing said transmission time measurement by using said latched transmit code phase, a latched number of chips in said transmission chip counter, a latched number of code periods in said transmission code boundary counter, a latched number of bits in said transmission bit counter, and a latched transmission time in said transmission time counter, by a transmission time measurement module.

16. The method of claim 15, further comprising initializing said transmission time counter with a time value in synchronization with a pulse per second signal generated by an external reference time source by an initialization module executed by said at least one processor, further comprising programming said transmission pseudorandom code generation module to generate said pseudorandom code by said initialization module, and further comprising programming said reception pseudorandom code generation module to generate said replica pseudorandom code by said initialization module.

17. The method of claim 16, wherein said initialization module programs a buffer in said transmit channel with time frame data bits of said time frame data signal prior to transmission of said time frame data signal as a modulated intermediate frequency signal, and wherein a field programmable gate array logic phase synchronizes start of said time frame data signal and start of said chips of said pseudorandom code with a pulse per second signal generated by said external reference time source.

18. The method of claim 14, wherein said generating of said reception time measurement by said reception time generation module comprises:
   upcounting a number of chips of said replica pseudorandom code generated by said reception pseudorandom code generation module by a reception chip counter of said reception counters, wherein an overflow of said reception chip counter indicates a code period;
   upcounting a number of code periods indicated by said overflow of said reception chip counter by a reception code boundary counter of said reception counters;
   upcounting a number of bits of a frame in said time frame data signal by a reception bit counter of said reception counters, wherein an overflow of said reception bit counter indicates completion of reception of time frame data;
   upcounting a reception time counter of said reception counters on completion of said reception of said time frame data; and
   computing said reception time measurement by using said latched receive code phase of said replica pseudorandom code, a latched number of chips in said reception chip counter, a latched number of code periods in said reception code boundary counter, a latched number of bits in said reception bit counter, and a latched reception time in said reception time counter, by reception time measurement module.

19. The method of claim 14, further comprising generating said modulated intermediate frequency signal to be transmitted to each of said remote ground stations via an intermediate frequency filter and a frequency up converter after performing said digital phase modulation of said generated spread signal in a binary phase shift keying modulator.

20. The method of claim 14, further comprising multiplying and up converting said generated spread signal with an intermediate frequency carrier signal generated using a carrier signal generator, a cosine lookup, and a frequency up-converter and transmitting a radio frequency signal to each of said remote ground stations.

21. The method of claim 14, wherein said latch epoch generation module latches said transmission time measurement of said transmit channel and said reception time measurement of one of said receive channels independent of another of said receive channels.

22. The method of claim 14, further comprising measuring time required for said modulated intermediate frequency signal to traverse a path to and from a satellite and converting said measured time to a distance between said satellite and said time interval measurement transceiver by a ranging module for said satellite ranging using a formula:

(distance between said satellite and said time interval measurement transceiver)=[(measured time) *(a velocity of light)]/2.

23. The method of claim 14, further comprising encrypting and adding hash to said time frame data signal by an encryption module and hash generation module executed by said at least one processor and decrypting and authenticating said time frame data signal by a decryption and authentication module executed by said at least one processor.

24. The method of claim 14, wherein said transmission pseudorandom code generation module and said reception pseudorandom code generation module further comprise pseudorandom code generators respectively, wherein said pseudorandom code generators are one of a linear feedback shift register based code generator and a programmable memory code based code generator.

25. A time interval measurement transceiver implementing code division multiple access, positioned in a remote ground station for performing two-way satellite time and frequency transfer and satellite ranging, said time measurement transceiver comprising:
   a clock manager for generating a sampling clock for transmitting a modulated intermediate frequency signal and performing baseband processing of an intermediate frequency signal received from a central ground station;
   a transmit channel operably coupled to said clock manager for generating a spread signal that is digitally phase modulated to generate and transmit said modulated intermediate frequency signal, said transmit channel comprising:
      a first mixer operably coupled to a transmission pseudorandom code generation module for generating said spread signal by multiplying a time frame data signal with a pseudorandom code generated by said transmission pseudorandom code generation module; and
      a transmission time generation module for generating a transmission time measurement on latching of a transmit code phase of said pseudorandom code, and a number of chips of said pseudorandom code, a number of code periods of said pseudorandom code, and a number of bits in said time frame data signal upcounted in a plurality of transmission counters when a latch measurement signal is received from a latch epoch generation module in a receive channel;
   said receive channel operably coupled to said clock manager, said receive channel comprising:
      an acquisition and tracking module for acquiring and tracking said received intermediate frequency signal from said central ground station;
      one or more second mixers for receiving intermediate frequency time data samples from an external interface unit and generating inphase components and quadrature phase components of said received intermediate frequency time data samples by mixing said received intermediate frequency time data samples with a carrier reference signal locally generated by a local carrier generator of said receive channel, wherein said intermediate frequency time data samples correspond to said received intermediate frequency signal from said central ground station;
      a plurality of correlators for correlating a pseudorandom code in said received intermediate frequency time data samples by multiplying and accumulating each of said generated inphase components and said generated quadrature phase components of said received intermediate frequency time data samples with three or more arms of a replica pseudorandom code generated by a reception pseudorandom code generation module;

a reception time generation module for generating a reception time measurement on latching a receive code phase of said replica pseudorandom code, and a number of chips of said replica pseudorandom code, a number of code periods of said replica pseudorandom code, and a number of bits in said intermediate frequency time data samples in a plurality of reception counters when said latch measurement signal is received from said latch epoch generation module; and said latch epoch generation module for generating said latch measurement signal on overflow of one of said reception counters for generating said transmission time measurement of said transmit channel and said reception time measurement of said receive channel; and at least one processor communicatively coupled to said clock manager, said transmit channel, and said receive channel, said processor configured to execute computer program instructions defined by modules of said time interval measurement transceiver, said modules of said time interval measurement transceiver comprising:

a time interval measurement module for computing a time interval measurement; and a time interval transmission module for transmitting said computed time interval measurement to said central ground station via said transmit channel via one of a dedicated wired link and a wireless link.

26. The time interval measurement transceiver of claim 25, wherein said transmit channel further comprises an encryption and hash generation module for encrypting said time frame data signal and said receive channel further comprises a decryption and authentication module for decrypting and authenticating said time frame data signal.

* * * * *